(12) United States Patent
Cheng et al.

(10) Patent No.: US 10,118,315 B1
(45) Date of Patent: Nov. 6, 2018

(54) PREPARING TOOL SURFACES FOR COMPOSITES

(71) Applicant: Aerospace Materials Processing, LLC, Redondo Beach, CA (US)

(72) Inventors: Siu F. Cheng, Culver City, CA (US); Mikhail M. Grigoriev, Albequerque, NM (US); Robert F. Hicks, Los Angeles, CA (US)

(73) Assignee: Surfx Technologies LLC, Redondo Beach, CA (US)

( * ) Notice: Subject to any disclaimer, the term of this patent is extended or adjusted under 35 U.S.C. 154(b) by 323 days.

(21) Appl. No.: 14/271,428

(22) Filed: May 6, 2014

Related U.S. Application Data

(60) Provisional application No. 61/820,115, filed on May 6, 2013.

(51) Int. Cl.
| | |
|---|---|
| *B29C 33/42* | (2006.01) |
| *B29C 70/00* | (2006.01) |
| *B29C 67/00* | (2017.01) |
| *B29C 33/38* | (2006.01) |
| *B33Y 10/00* | (2015.01) |

(52) U.S. Cl.
CPC .......... *B29C 33/42* (2013.01); *B29C 33/3842* (2013.01); *B29C 67/0055* (2013.01); *B29C 70/00* (2013.01); *B29K 2863/00* (2013.01); *B29K 2879/00* (2013.01); *B29K 2905/00* (2013.01); *B29K 2905/02* (2013.01); *B29K 2907/04* (2013.01); *B33Y 10/00* (2014.12)

(58) Field of Classification Search
None
See application file for complete search history.

(56) References Cited

U.S. PATENT DOCUMENTS

| | | | | |
|---|---|---|---|---|
| 2002/0098426 | A1* | 7/2002 | Sreenivasan | B29C 35/0888 430/22 |
| 2004/0131718 | A1* | 7/2004 | Chou | G03F 7/0002 425/385 |
| 2004/0247732 | A1* | 12/2004 | Walk | B29C 33/3842 425/385 |
| 2005/0064344 | A1* | 3/2005 | Bailey | B82Y 10/00 430/320 |

(Continued)

OTHER PUBLICATIONS

Makerbot.wikidot.com, Printing problems; raft detaching, Oct. 15, 2011, found at http://makerbot.wikidot.com/forum/t-401060/printing-problems-raft-detaching.*

*Primary Examiner* — James Mellott
(74) *Attorney, Agent, or Firm* — Canady & Lortz LLP; Bradley K. Lortz

(57) ABSTRACT

Techniques for producing composites outside of an autoclave that have smooth surface finishes are disclosed. The smooth composite surface, free of porosity, can be fabricated by curing the prepreg in a tool that includes a novel microstructure. In conventional composite manufacturing, some degree of porosity appears to originate from trapped gas bubbles that form during curing. The microstructure can provide a mechanism for the gas bubbles to escape from the tooling, thereby eliminating porosity and yielding a smooth surface finish on the out-of-autoclave composite. The microstructure can be applied to the tool surface using an inkjet process applying an acrylic resin curable with ultraviolet light.

19 Claims, 18 Drawing Sheets

(56) References Cited

U.S. PATENT DOCUMENTS

| | | | |
|---|---|---|---|
| 2006/0054039 A1* | 3/2006 | Kritchman | B29C 41/02 101/424.1 |
| 2008/0053326 A1* | 3/2008 | Murphy | B41C 1/003 101/395 |
| 2013/0292879 A1* | 11/2013 | Disawal | B29C 45/372 264/328.2 |

* cited by examiner

PREPARING TOOL SURFACES FOR COMPOSITES

CROSS-REFERENCE TO RELATED APPLICATIONS

This application claims the benefit under 35 U.S.C. § 119(e) of the following U.S. provisional patent application, which is incorporated by reference herein:

U.S. Provisional Patent Application No. 61/820,115, filed May 6, 2013, and entitled "METHOD AND APPARATUS FOR PREPARING COMPOSITES", by Cheng et al.

STATEMENT OF GOVERNMENT RIGHTS

The invention described herein was made in the performance of work under contract with the United States Air Force Research Laboratories (US-AFRL) under contract number FA8650-12-M-5163 in which the contractor has elected to retain title.

FIELD OF THE INVENTION

Out-of-autoclave (OoA) processing of composites is an emerging technology that requires further development in order to meet the burgeoning demands of the aerospace industry. Compared to fabricating composites in autoclaves, OoA processing provides higher throughput at greatly reduced capital cost. In particular, this approach eliminates the main bottleneck in aircraft production—processing materials in an autoclave. The expected gain in production efficiency through OoA processing will enable the industry to meet the fourfold increase in demand for aerospace composite materials over the next 15 years. In general, compared with autoclave processing, OoA processing requires minimal investment, significantly reduces material and manufacturing costs, and also reduces environmental impact.

The most promising OoA technique—vacuum bag only (VBO) processing—has many advantages: large cost reduction, no size limitations, wide supplier base, improved dimensional control, repeatability, and the possibility of automation. However, several challenges must be overcome before this technology can be widely adopted. One of the initial problems was the resin chemistry. In contrast to conventional autoclave processes, VBO material cannot reach the temperatures and pressures necessary to push out the gases evolved during condensation curing. Fortunately, prepreg suppliers have developed addition-cure resins that do not evolve gas during the cure cycle. This has led to a second problem: The low hydrostatic pressure of the addition-cure resins, and the lack of positive pressure during VBO processing, has led to incomplete resin flow, causing porosity in some areas of the cured structure. Incomplete wet-out on mold-released tool surfaces was also observed, resulting in pitted surfaces. Porosity within the structure causes a rapid drop off in the inter-laminar shear strength. For example, a 50% drop in shear strength is observed at 8% void volume.

Today, out-of-autoclave composites are competitive with autoclave prepreg in mechanical performance. The OoA addition-cured resins have been tailored to flow under a pressure gradient of 1 atmosphere or less, and exhibit porosity levels of ≤0.5% within the composite, matching that of materials cured in an autoclave. The resin formulations are commercially available from a number of suppliers, such as Cytec's CYCOM® 5320-1 and Advanced Composites Group's MTM 45-1. However, the problem of pitted tool surfaces with surface porosity >2.0% has not been adequately addressed. On flat tooling, the pitting can be eliminated by employing polytetrafluoroethylene (PTFE) film. Nevertheless, non-stick plastic film does not conform well to contoured surfaces (potentially leaving wrinkles) and is not practical for most aircraft applications. Workarounds such as peel ply and surfacing films have been developed, but these significantly add to material and labor costs, and increase component weight.

In view of the foregoing, there is a need in the art for techniques for curing OoA composites that yields material with smooth surfaces virtually free of pitting and maximize the strength-to-weight ratio if OoA composites. There is a need for such techniques to greatly reduce gas bubbles from being trapped at the mold-composite interface resulting in porosity. Particularly, there is a need for such techniques to be operable with contoured shapes. There is a need for such techniques to be cost effective and not labor intensive. These and other needs are met by embodiments of the present invention as described hereafter.

SUMMARY OF THE INVENTION

Techniques for producing composites outside of an autoclave that have smooth surface finishes are disclosed. The smooth composite surface, free of porosity, can be fabricated by curing the prepreg in a tool that includes a novel microstructure. Ordinarily, some degree of porosity appears to originate from trapped gas bubbles that form during curing. The microstructure can provide a mechanism for the gas bubbles to escape from the tooling, thereby eliminating porosity and yielding a smooth surface finish on the out-of-autoclave composite.

In another aspect, embodiments of the invention can apply to methods of preparing tooling for out-of-autoclave composites that contain the novel microstructure that eliminates surface pitting. These novel methods include etching a pattern into the tool, or depositing a patterned coating onto the tool. Among the preferred methods of etching patterns into metal, e.g., aluminum, tools, a chemical etch is desirable, and in particular one similar to that used to anodize the metal. Among the preferred methods of etching patterns into structural polymers, e.g., composite, tools, a chemical etch or a plasma etch is desirable. One such etch technique is to lay down a mask that creates a desirable surface pattern, and then to etch away the top organic layer of the composite using an oxidizing plasma, such as an atmospheric pressure oxygen plasma. The mask can be a mechanical mask that has been micro-machined with the desirable pattern, or it can be a photoresist mask that is exposed to ultraviolet light, then developed and rinsed to expose the pattern on the tool surface.

The method of preparing the tool surface with the desired microstructure includes multiple steps that are necessary to practice the invention. The tool used to manufacture the out-of-autoclave composite is made of, but not limited to, aluminum, stainless steel, invar, and carbon-fiber-reinforced composites, including epoxy, bismaleimide, polycyanate ester resin, and thermoplastic polymers. The tool can have a flat shape or be contoured, with the specific shape determined by that of the final composite structure. For example, an aircraft wing manufactured from out-of-autoclave composite can be prepared in a tool that has the desired shape of the wing to be produced. The tool acts like a mold. Out-of-autoclave composite is laid up in the tool by stacking together layers of prepreg. Then the entire tool is placed inside a vacuum bag, and cured by heating following the temperature ramp, soak and cool-down cycle recommended by the supplier of the composite.

Essential steps in practicing embodiments of the invention include tool surface cleaning, activation, and generation of the microstructure. Cleaning may be accomplished by rinsing the surface with detergent or an organic solvent, and thorough drying. Alternatively, the tool may be cleaned by mechanical abrasion, such as by sanding or by grit blasting. Surface activation of the tool is essential for strong adhesion of the film containing the microstructure. A novel way to activate the tool surface is by exposure to a low temperature, atmospheric pressure plasma. This plasma can generate reactive oxygen species, such as ground-state oxygen atoms, that clean organic contamination off of the surface, and then terminate it with desired functional groups which promote strong adhesion of the film with the microstructure. In certain cases, it is advantageous to use the atmospheric pressure plasma to both clean and activate the surface. This allows you to avoid mechanical abrasion, which in some cases can damage the tool, and/or make the preparation process much more expensive Another aspect of this invention is to use low-temperature, atmospheric pressure plasma to clean and activate the tool surface prior to generating the microstructure. The atmospheric pressure plasma may be operated in the open air, and be fed with oxygen, or an oxygen-containing gas. Examples of oxygen-containing gases, include air, air mixed with argon, oxygen mixed with argon, oxygen mixed with argon, such that the amount of oxygen is less than 10.0 volume % and preferably less than 5.0 volume %. The atmospheric pressure plasma is generated in a self-contained housing that is swept over the surface of the tool in a controlled fashion such that the entire tool surface is uniformly exposed to the reactive gases emanating from the self-contained plasma device. Exposure times needed to achieve a clean and activated tool surface vary depending on whether the tool is made of aluminum, stainless steel, invar, and carbon-fiber-reinforced composites, including epoxy, bismaleimide, polycyanate ester resin, and thermoplastic polymers. Generally these exposure times will be from a few seconds to a few minutes, and result in translation speeds over the tool surface at 1 mm/s up to 100 mm/s. To achieve proper activation, one may have to scan the self-contained plasma device over the tool surface multiple times, ranging from 2 to 25 times.

Another aspect of the invention relates to the method of achieving a cured composite surface with no pitting through a variation of microstructure production steps including, but not limited to, using materials in the microstructure film that promote release of the composite off of the tool. Alternatively, the microstructure may be coated with a mold release that has little or no effect on the topography of the microstructure. The mold release can be applied as a liquid, aerosol, or dry chemical.

Yet another aspect of the invention generally relates to the method of generating a microstructure that has the appropriate height and width to allow trapped gas bubbles to escape out of the tool during curing, and yield out-of-autoclave composites with smooth surface finishes. Novel microstructures which uniquely create the escape routes for the evolving gases are in the range of 1 to 200 microns, and preferably in the range of 10 to 100 microns. The height-to-width ratio of individual microstructures on the tool surface is important, as well as the spacing between these microstructures. A further description of desirable height-to-width ratios, shapes and patterns is given in the specification below.

Further, the invention relates to a tool used to layup and cure out-of-autoclave composites. The unique feature of this tool is that its surface has a topography in the micron-scale range that allows for curing of the composite under vacuum and heat that does not trap gas bubbles, and consequently, does not leave any pits or pores in the finished composite surface. The tool material may vary and includes but is not limited to: aluminum, stainless steel, invar, and carbon-fiber-reinforced composites, including epoxy, bismaleimide, polycyanate ester resin, and thermoplastic polymers.

The out-of-autoclave composite is generally made from, but is not limited to, a carbon-fiber tow imbedded in an epoxy resin, or other polymeric matrix material. This composite is cured by placing the prepreg (uncured material) into the tool and applying vacuum and a necessary amount of heat with the matrix cure specifications as set forth by the composite supplier.

In another aspect, the invention relates to a method for producing microstructures on the tool by following the steps of cleaning the surface, activating it for adhesion, applying a film to the entire surface of the tool with the desired microstructure, and coating said microstructure with a thin mold release. The mold release prevents the composite from sticking to the tool during the cure process, and at the same time does not affect the height variation, shape and pattern of the structured film.

Another embodiment of the invention is the method of depositing the film with the microstructure. This method may include, but is not limited to, applying a liquid coating, and then curing this coating by exposure to ultraviolet light, heat, or another energy source to cause the liquid to polymerize and condense into a solid film on the tool surface. In another aspect the invention relates to a method of creating the film with the microstructure in which the said film is deposited by chemical vapor deposition, and in particular, plasma-enhanced chemical vapor deposition. Described below is a method of depositing a hydrophobic film onto the tool surface by means of atmospheric pressure, plasma-enhanced chemical vapor deposition. This latter method can be applied to the tool without the tool being inside a chamber. The advantage of this method is that it can be applied to a tool of any size, such as that needed to manufacture a passenger aircraft, or a large rocket (e.g., the Saturn 5 rocket). Materials used for microstructure production may not necessarily promote release of the cured composite later on. In this case, the microstructure may need to be coated with a mold release prior to laying up the prepreg used to generate the OoA composite.

The invention generally relates to producing a microstructure on a tool surface that can be used to manufacture out-of-autoclave composites with smooth surface finishes. A unique method of generating the microstructure is ink-jet printing. This technique is readily adapted to tools used in the manufacture of aerospace structures. Suitable materials for ink-jet printing include polymers dissolved or dispersed in a suitable solvent that once applied to the tool may be cured by exposure to heat, ultraviolet light, or another energy source. Suitable materials include, but are not limited to, polymethylmethacrylate (acrylic), fluoropolymer, polytetrafluoroethylene (PTFE), fluorinated ethylene propylene (FEP), urethane, epoxy, silicone, polyimide, polyamide-imide, polysulfone, polyvinylchloride, polycarbonate, polybutylene, polyphenylene oxide, polyphenylene sulfide, liquid crystal polymer, polyetheretherketone, or polyethersulfone. After curing, some of these polymer films may or may not require further application of a mold release.

The microstructure that yields a porosity-free, out-of-autoclave composite may have a pattern. This pattern can be a grid of overlapping lines, a weave-like structure of undulating features in plain, twill, satin, or other complex interlacings, or it can be a series of parallel, perpendicular, or slanted mounds. The microstructure can be a series of interconnected channels in a repeating or unique pattern of straight and curved lines. The microstructure can be laid down with repeating shapes of a cylinder, square, triangle, polygon, or other shape, and not necessarily intersect, or overlap. The lines or individual components of the microstructure can be laid down with a vertical height of 0.1 to 250 micrometers (microns), preferably between 1 and 10 microns. The lines or individual components of the microstructure can have a sine, square, triangle, sawtooth, or complex cross sectional waveform with bottommost width of 1 to 1,000 microns, and topmost width of 1 to 1,000 microns. The separation between repeating lines, or channel width, of the microstructure can vary from 1 to 1,000 microns.

BRIEF DESCRIPTION OF THE DRAWINGS

Referring now to the drawings in which like reference numbers represent corresponding parts throughout, closely related figures have the same number but different alphabetic suffixes.

DETAILED DESCRIPTION OF THE INVENTION

1. Overview

In general, embodiments of the invention involve tool surfaces are prepared with a microstructure applied thereto such that when the tool is used to form a composite the gases evolved during processing are guided away from the composite material by the microstructure on the tool surface. This prevents gas bubbles from being trapped at the tool-composite interface which would otherwise generate pits along the surface of the composite. Embodiments of the invention presented hereafter describe novel tool microstructures and techniques for their application that can safely bleed away gases and yield OoA materials with smooth finishes. In addition, specific embodiments of the invention are presented which relate to novel methods of fabricating tools with surface structures that are well suited for producing porosity-free, out-of-autoclave composites.

Embodiments of the invention are directed to techniques for applying a microstructure to a composite tool surface. The microstructure comprises a patterned structure of varying height from the tool surface which is bonded to the tool surface. The particular patterned structure (having a topographical variation) can be engineered based on the particular composite material which manufactured on the tool. For example, the patterned structure may comprise rectangles, triangles, circles, or any other shape produced in a repeating pattern of three-dimensional relief on the tool surface. In one example, the patterned structure may comprise the form of a plain weave, but in microscale. Typically, the microstructure height varies from 1 to 200 micrometers from the tool surface, and can preferably be limited from 10 to 100 micrometers. Some examples of microstructure patterns are provided hereafter.

Application of the microstructure requires a process capable of forming three-dimensional structures in microscale (e.g. as small as 1 micrometer). In one example, microstructures may be applied to a tool surface using an inkjet process. A known inkjet mechanism may be employed to precisely deliver a pattern onto a tool surface. In this case, rather than ink, the medium delivered by the inkjet must be capable of forming a durable material capable of withstanding all applied environments of the applicable composite manufacturing, e.g. temperature, pressure, etc., thereafter. For example, the inkjet may be used to deliver an acrylic resin which is curable under exposure to ultraviolet (UV) light.

Figure 1A:
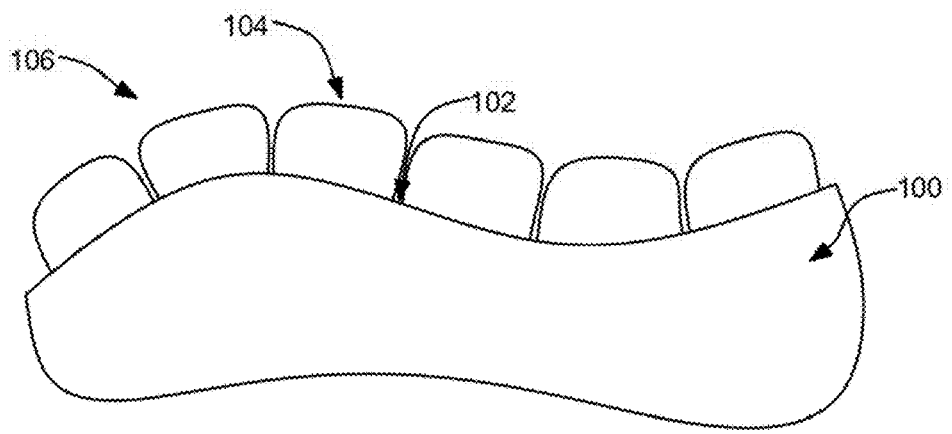
FIG. 1A Microstructure applied to a tool surface comprising a patterned structure of varying height from the tool surface.

FIG. 1A is a schematic diagram of an example tool surface prepared with a microstructure according to an embodiment of the invention. The diagram is not to scale. The composite tool 100 has a surface 102 onto which a composite is to be formed. The tool surface 102 has a microstructure 106 comprising a patterned structure of varying height from the tool surface disposed thereon. In this example, the microstructure comprises distinct elements 104 which are part of the repeating pattern across the tool surface 102. As detailed hereafter, many other possible variants to the pattern and elements may be employed. In addition, there are many possible processes which may be employed to apply the microstructure 106 to the tool surface 102. In one example an inkjet process may be employed. Prior to application of any microstructure 106, the tool surface 102 may be suitably cleaned (e.g. using solvent) and/or prepared (e.g. with a plasma treatment) to improve adherence and other properties of the microstructure material.

Figure 1B:
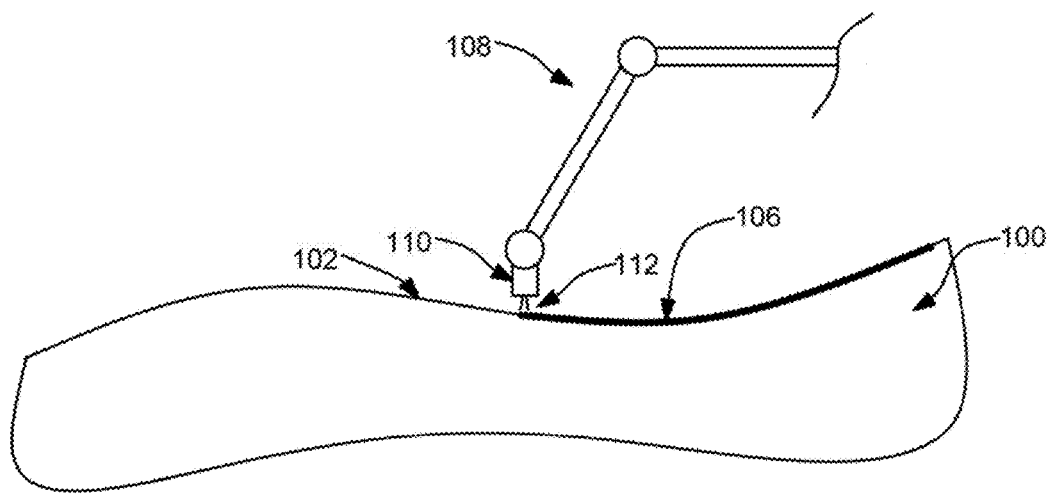
FIG. 1B Exemplary inkjet process applying a microstructure to a tool surface.

FIG. 1B is schematic of a microstructure pattern 106 of the UV curable acrylic resin 112 being applied by an inkjet 110 to a tool surface 102. In this example, the inkjet 110 head is affixed to a robot arm 108 which is computer controlled to precisely follow the tool surface 102. The resin 112 is "printed" onto the tool surface 102 from the inkjet 110 head in the microstructure pattern 106. After applying the acrylic resin 112 in the microstructure 106 pattern to the surface 102, the acrylic resin 112 is cured under UV light such that it becomes durable and bonded to the tool surface. Thereafter, the tool surface 102 with the bonded microstructure 106 may be used as a mold for a composite material cure employed in any known manufacturing process to produce a composite. For example, a release agent may be applied to the surface 102 with the bonded microstructure 106 to facilitate separation of the composite from the tool 100 after composite curing. Such release agents have a low surface energy which promotes hydrophobicity thus allowing the tool and the composite, cured on the tool, to separate easily from one another. For example, plasma surface treatments may be further applied after production of the microstructure 106 on the tool surface.

The resulting microstructure greatly reduces surface porosity of the resulting composite, i.e. surface pitting which have concave shapes and typically resemble miniature pot holes in the tool side surface of the composite. Notably, the microstructures of the present invention may be applied in the manufacture of composites having shaped, not just flat, surfaces. Typically, the varying height of the microstructure from the tool surface varies from 1 micrometer to 200 micrometers. The patterned structure of varying height from the tool surface may comprise a weave, a grid, a twill pattern, a harness satin, checkerboard, parallel ridges, or interconnected channels or any other pattern. The patterned structure can comprise elements including rectangles, triangles, or circles or any other shapes. The microstructure may be formed from a material comprising a resin, an acrylic, a paste or any other material which can result in a durable microstructure capable of surviving the composite manufacturing environment.

Figure 1C:
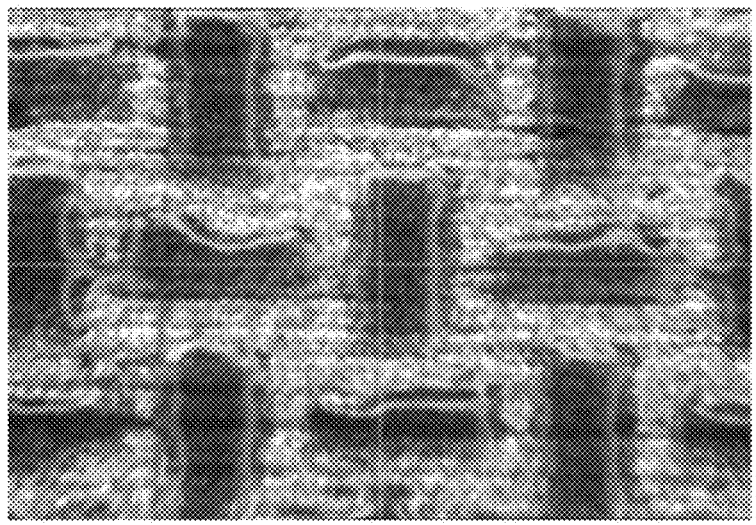
FIGS. 1C-1E Exemplary microstructures on a tool surface and the resulting composite.
Figure 1D:
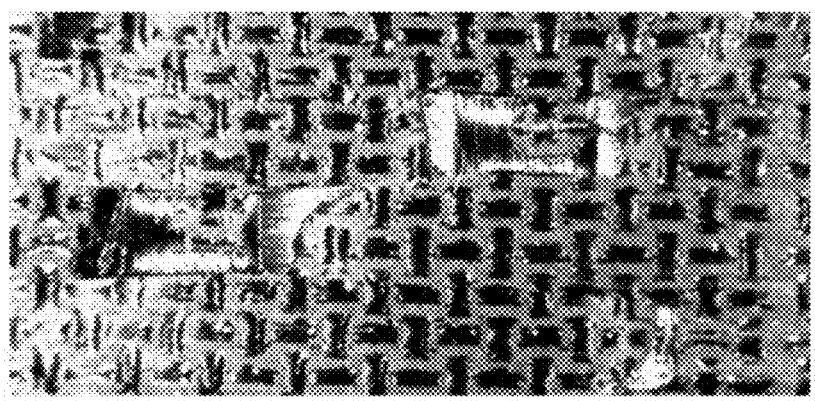
Figure 1E:
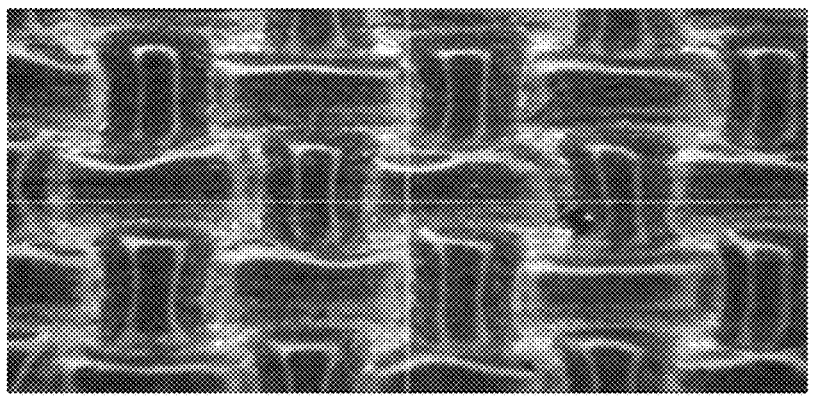

It should be noted that in use, the repeating pattern of the microstructure 106 imparted onto the tool surface (FIG. 1C) transfers a substantial mirror image onto the surface of the composite cured against said tool (FIG. 1D) yielding a novel quality to the surface of the resulting composite not producible by conventional composite manufacturing processes. The repeating microstructure on the tool comprises a series of rectangular mounds that are similar in shape and size but have local variations and different spatial orientation. In the repeating pattern shown in FIG. 1C, rectangular elements are laid out in an alternating vertical and horizontal plain weave pattern. Other possible patterns include rectangular elements laid out in a twill pattern, harness satin, checkerboard, parallel ridges, or other repeating patterns. The elements within the pattern can be rectangular in shape, or square, or circular, or oval, or a continuous. The pattern transferred onto the cured composite is a mirror image of the pattern on the tool, except that the elements covering the laminate surface are indentations or divots with dimensions equal to or less than that observed on the tool. FIG. 1E shows a repeating pattern similar to the one shown in FIG. 1C, but with different spacing between the elements and a different height.

2. Typical Prior Art Prepreg Out-of-Autoclave Composite Manufacturing

An exemplary prior art method of manufacturing out-of-autoclave composites involves the layup of the uncured prepreg onto tooling either covered with a mold release film or with a sheet(s) of release ply. The procedure used to demonstrate the prior art and the subject invention are described below.

To begin tool preparation, 10"×10" squares made of 6061-T6 aluminum were laid out on a clean table with a sheet of plastic protecting the table surface. The top surface of each tool was worked with Scotch-Brite™ 7448 and Desoclean® 45 (Batch #20317, MFD 06/12/12) to a dull gray finish. Clean cheesecloths with Grade A isopropyl alcohol (IPA; Randolph Product Co., Batch #18135) were used to remove residue left after the Desoclean step. The IPA wipe was repeated with clean cheesecloths until no residue was left on the tool and the wipe came up clean.

After a ten minute IPA flash-off period, the first layer of Frekote® 815-NC (Henkel Corp., P/N 91298-0001, Lot # LN2DAA0130, DOE 10/2013) was applied by wiping the tools in a single direction. Note that prior to using the Frekote, the jug was agitated and turned upside-down to mix the contents and the clarity checked by pouring the release agent into a clear measuring cup. Frekote was then poured from the clear measuring cup onto clean cheesecloth to apply the first coat. The tools were then placed into a Yamato DKN602C oven pre-heated to 350° F. and baked for two hours.

While still warm from the bake, tools were coated with a second application of Frekote using the same damp cheesecloth but applying the release agent at a 90-degree direction from the original application direction. Visual checks were performed during the first and second applications of Frekote to assure complete coverage. Each tool was placed into a separate heavy-duty zip lock bag to prevent scuffing and scratching until it was used for layup.

Figure 2A:
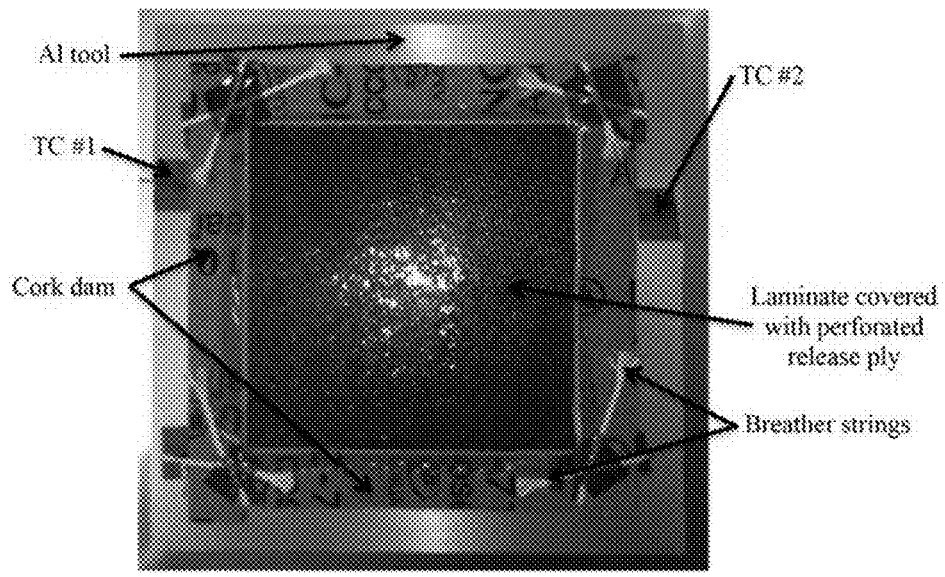
FIG. 2A Composite laminate ready for cure prior adding the breather layer and vacuum bag.

The composite comprising 6"×6" squares of out-of-autoclave (OOA), pre-impregnated, 5320-1/T650 with 8 harness satin weave were laid up in a semi-isotropic [0, 90, +45, −45] S orientation. A ten minute de-bulk step was performed after every four plies. During the de-bulk step the uncured laminates were surrounded with a bare cork dam (Gasket & Seal Fab. Inc., P/N NC-710-966) and covered with perforated release film (Airtech International Inc., P/N A4000-P6). Once the laminate was built up to eight plies the cork dam was repositioned to allow for placement of breather string (McMaster-Carr P/N 8818K41) around all four edges of the laminate. Two K-type thermocouples (TCs) were taped down using Flashbreaker 1 (Airtech International Inc., MFG # LOE-24) to the aluminum tool close to the laminate and perforated release film was placed once again over the prepreg. The combination of the OoA composite laminate and the tool is shown in FIG. 2A.

The prepared laminate/tool combination was surrounded with a breather cloth (Airtech International Inc., Airweave® N 10) and placed inside a premade vacuum bag (Airtech International Inc., part # WL7400) in an envelope style. A quick-disconnect vacuum fitting (Airtech International Inc., model # VV406TF) was positioned over the bag, but off the tool where a vent hole was cut for it. Thermocouple wires were embedded into half inch wide vacuum sealant tape (General Sealant Inc., GS43MR) and the bag was sealed shut utilizing the sealant tape on the three open sides. Vacuum was drawn to check the bag for leaks, a leak rate of no greater than 2 inches of mercury per 5 minutes is acceptable in order to proceed to the curing stage.

The panels were cured inside a Yamato DKN602C oven, while under vacuum provided by a GE Energy Saver 3/4HP motor with a CIT-ALCATEL pump head. Note that an autoclave, comprising a vessel which can be pressurized and heated, was not used to cure the composite. The temperature was monitored and recorded during curing using a Pico TC-08 data logger with one second recording intervals. Once cured and at temperature below 150° F., the vacuum bags were removed from the oven and unpackaged to reveal the finished composite panels. Prior to separating the panels from the tool, the zero direction and the tool treatment information was transferred to the bag side of each panel with a silver Sharpie® for reference.

Determination of Surface Porosity

Figure 2B:
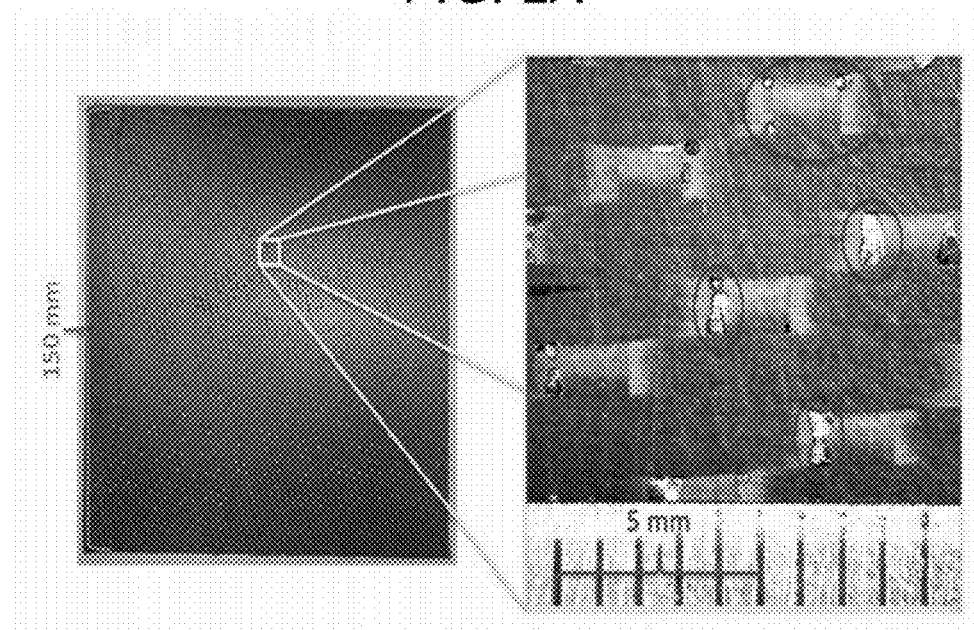
FIG. 2B Picture of out-of-autoclave composite panel cured on flat aluminum tool with a coating of mold release. The magnified image on the right shows examples of porous divots highlighted with red ovals.

In FIG. 2B, a picture is shown of a composite panel cured on a flat aluminum tool treated with Frekote mold release. A magnified section of the composite plate is also shown in which on sees examples of porosity. These comprise divots less than a millimeter wide. They are seen to occur at intersections between the weave in the carbon fiber.

Figure 3:
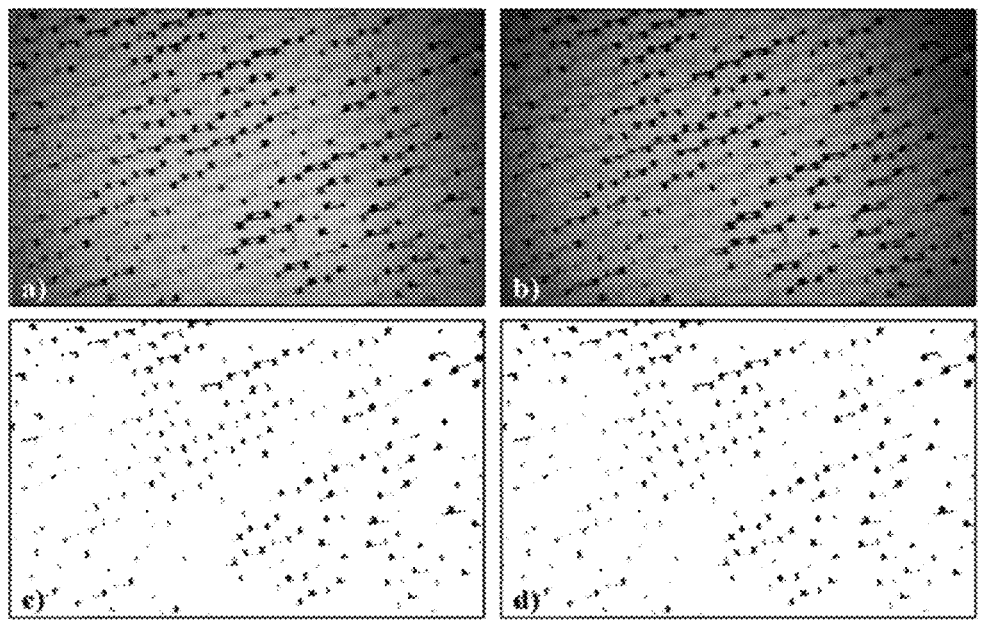
FIG. 3 Digital images of the OoA composite prepared on a flat aluminum tool with a coating of mold release (at 7× magnification): (a) full color photo; (b) 8-bit black and white photo; (c) B&W photo after contrast and brightness adjustment: and (d) B&W photo after binary conversion.

The cured composite surfaces were photographed using a Dino-Lite AD4013T-FVW digital microscope at 7× magnification after removal from the tool. A modified desktop lamp with a 40W incandescent light bulb and a plain paper light filter was used as a light source in place of the camera's integrated white LEDs to reduce glare and provide consistent background lighting. At least three full color (RGB) images were captured for each of the produced panels at 1280×960 dpi resolution. The image editing software package ImageJ was then used to convert from color to an 8-bit black and white picture. The contrast and brightness of the photo was subsequently adjusted until only the surface pitting was visible. Lastly, this was converted into a binary image and the number of black pixels was divided by the total pixels to produce a percent surface porosity. An example of the four-step image processing is presented in FIG. 3.

Use of a Release Ply

Figure 4:
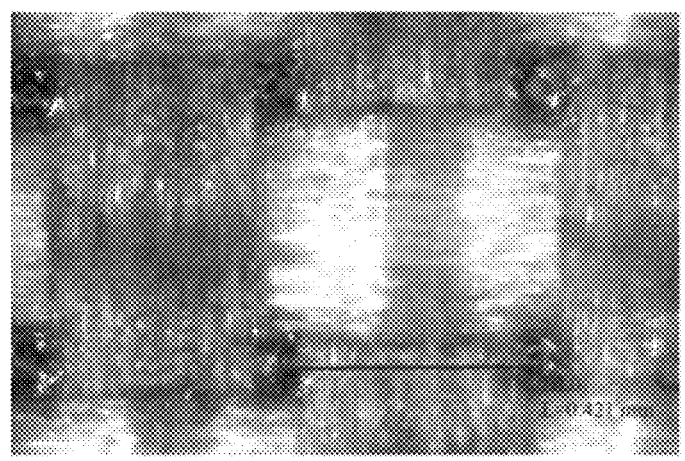
FIG. 4 Picture of Taconic 7058 release ply at 250× magnification. The fiberglass weave pattern is clearly evident.

A method known to produce an OoA composite with a smooth surface finish is to place a release ply on top of the clean aluminum tool, and layup and cure the prepreg in the same way as described above. This process was repeated in this work using a Taconic 7058 release ply between composite and the tool. Taconic 7058 is a special grade of woven fiberglass fabric that is coated with PTFE. This type of release is used for its temperature resistance (up to 500° F.), non-stick properties, and ability to yield porosity-free OoA composites. The fabric is non-porous, which prevents air, volatiles, and resin, from penetrating through it. Yet due to its construction—overlapping glass fiber weave—gaseous volatiles can be drawn along the fabric to its edges and escape out of the tooling. Shown in FIG. 4 is an image of the Taconic 7058 at 250× magnification. Using a micrometer tool built in with the camera, it was determined that the overlapping section of the weave repeat every 420 microns.

Figure 5:
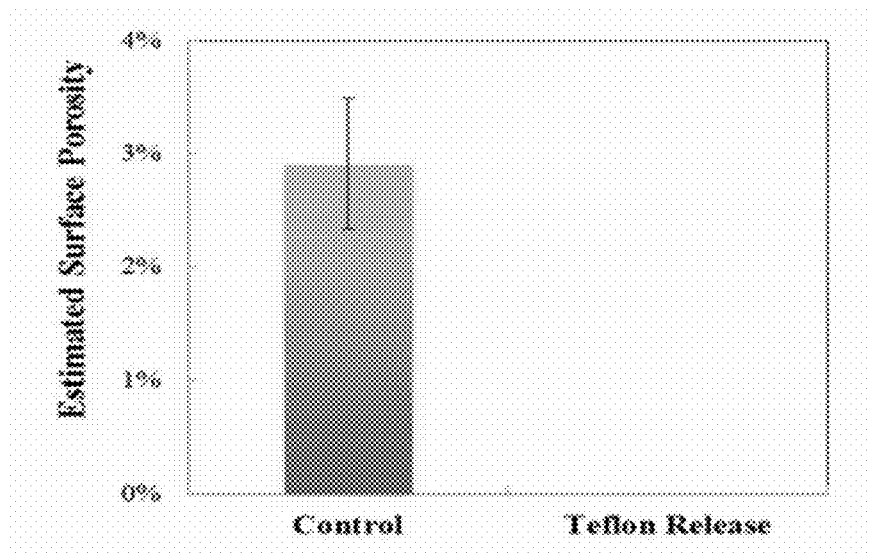
FIG. 5 Surface porosity of out-of-autoclave composites cured on: an aluminum tool that was coated with mold release (Frekote 815-NC), i.e., the "control"; and an aluminum tool that was covered with the Taconic 7058 release ply.

The surface porosity of OoA composites prepared on the Al tool with mold release (control) and the Al tool with the Taconic 7058 release ply are presented in FIG. 5. The composite cured on the plain aluminum tool had an average surface porosity of 3.0%. By contrast, no significant pitting was found on the composite cured with the release ply.

Figure 6:
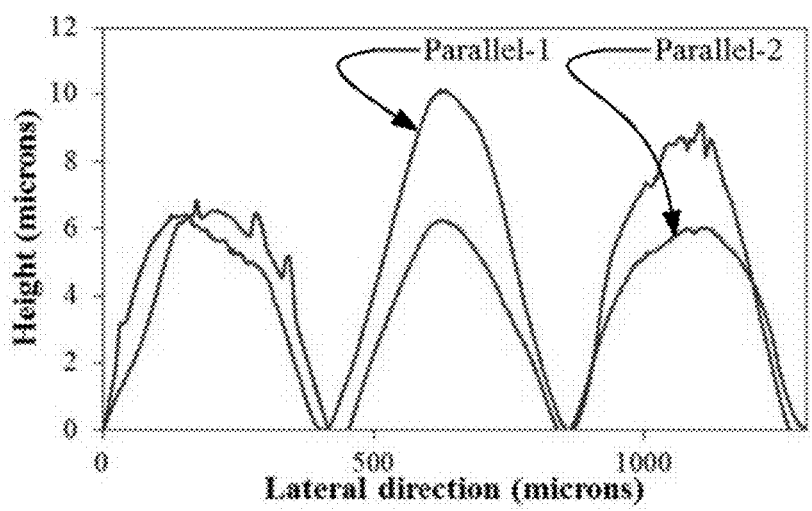
FIG. 6 Surface height profiles of the Taconic 7058 woven release ply.
Figure 7:
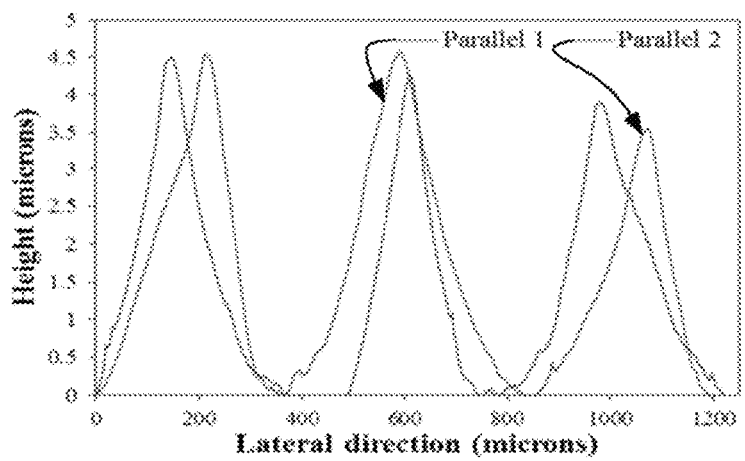
FIG. 7 Surface height profiles of out-of-autoclave composite cured on the aluminum tool that was covered with the Taconic 7058 woven release ply.

A Dektak™ 6 surface profilometer was used to analyze the topography of the Taconic 7058 release ply, and that of an OoA composite prepared on an Al tool with the release ply on top of it. These data are shown in FIGS. 6 and 7, respectively. The peaks of the release ply range from 6 to 10 microns in height and are separated by about 400 microns, corresponding to the weave structure. The topography of the OoA composite surface is nearly the same as that of the release ply. It has distinct peaks and valleys with a vertical separation of 3 to 4 microns and a lateral separation of 400 microns.

Figure 8:
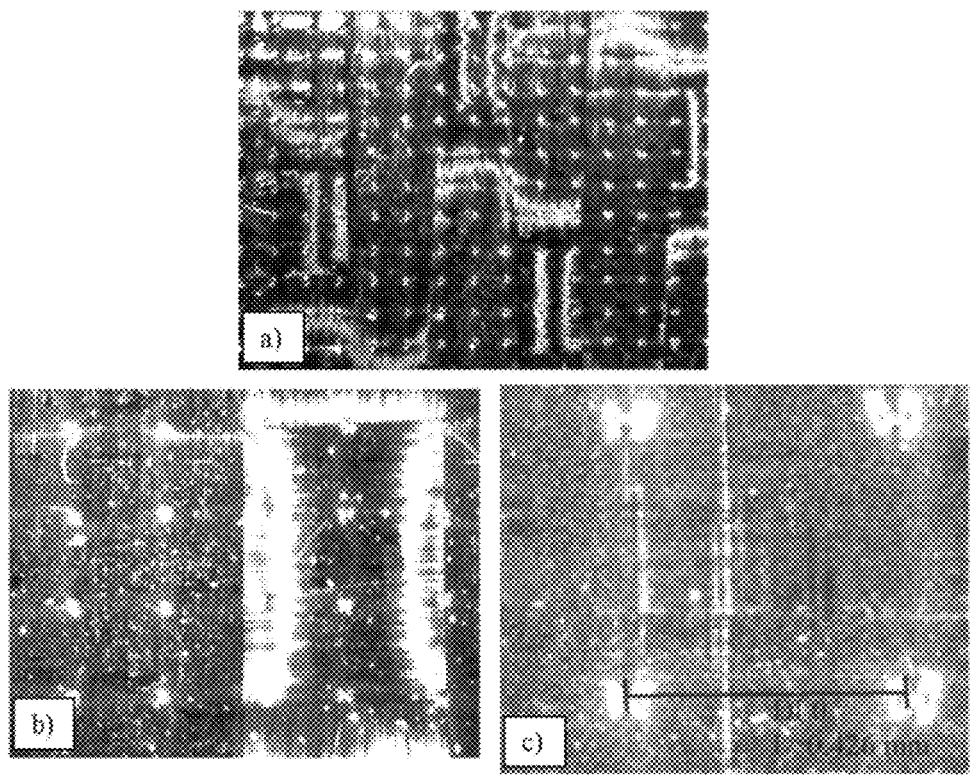
FIG. 8 Images of the out-of-autoclave composite cured on the Al tool covered with the release ply at three magnifications: (a) 30×, (b) 100×, and (c) 250×.

Shown in FIG. 8 are pictures of the out-of-autoclave composite at three different magnifications. The distance between the peaks on the composite plate match the micrometer measurement of the distance between wells on the release ply, i.e., 410 microns. These data show that when the composite cures, the pattern on the surface of the tool is transferred to the surface of the composite in contact with it.

Figure 9:
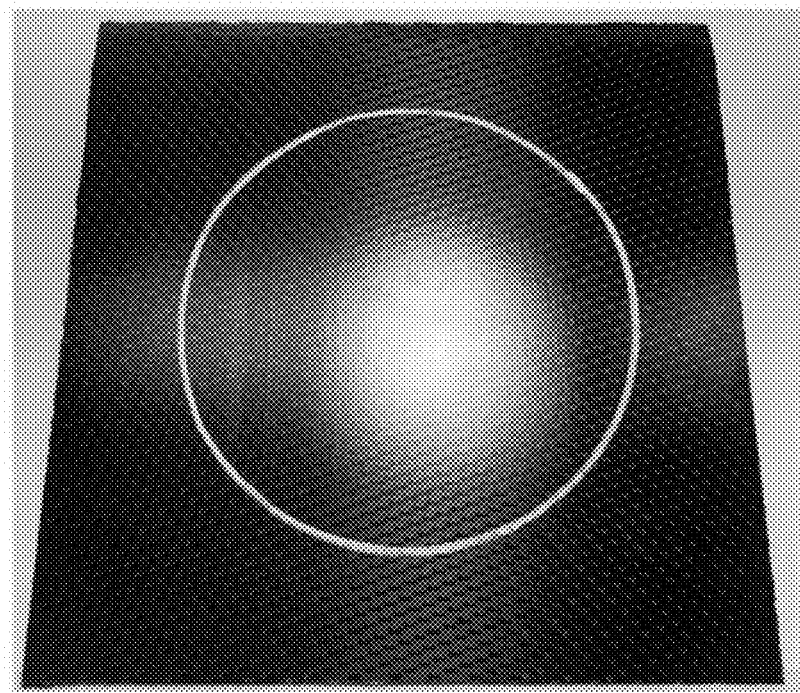
FIG. 9 Picture of out-of-autoclave composite panel cured on the Al tool covered with the Taconic 7058 release ply. The porosity was measured inside the white circle.
Figure 10:
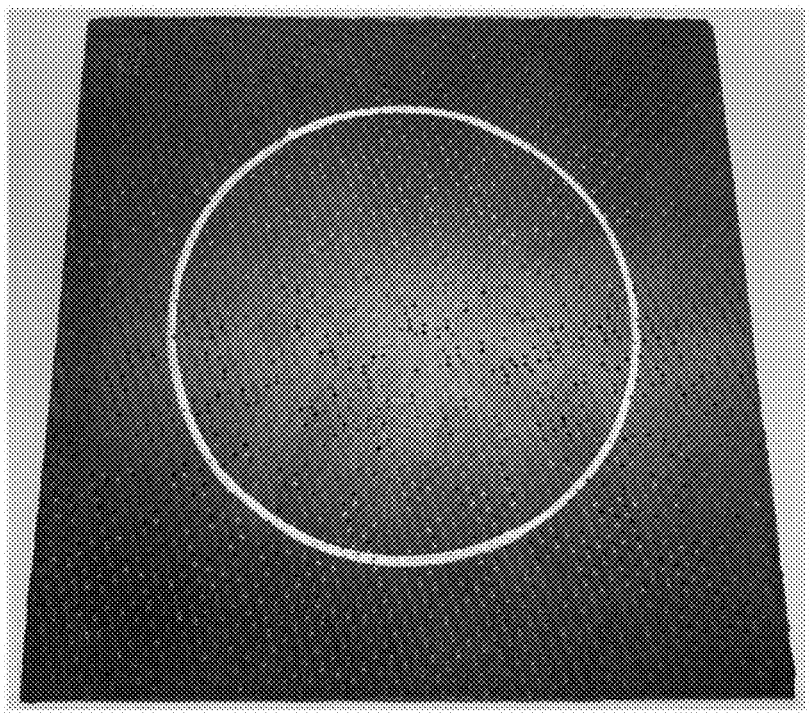
FIG. 10 Picture of out-of-autoclave composite panel cured on the Al tool coated with Frekote 815-NC mold release. The porosity was measured inside the white circle.

The panel cured with release ply between it and the tool is shown in FIG. 9. The surface is smooth with no identifiable pores. By contrast a panel cured on a flat aluminum tool covered with mold release is shown in FIG. 10. This control panel has many pits in it that are easily seen in the image.

Figure 11:
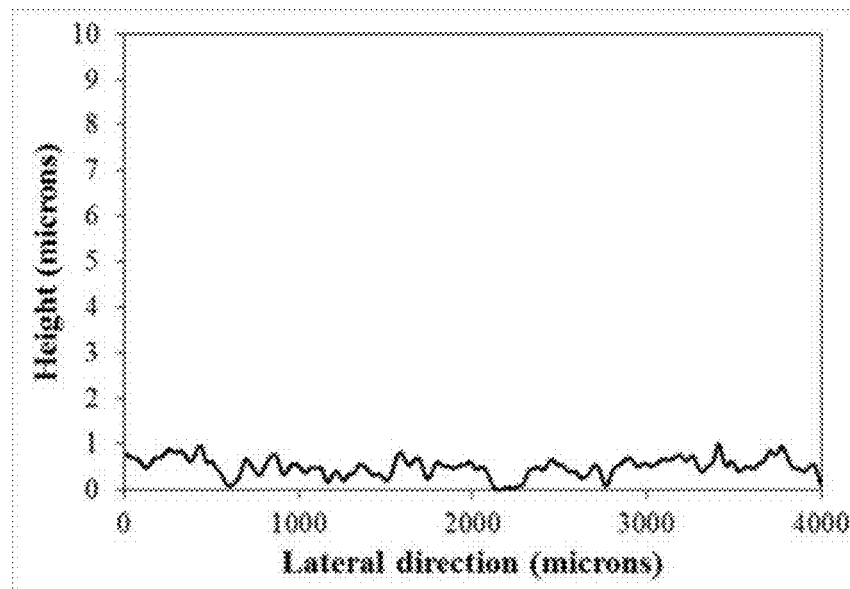
FIG. 11 Surface height profile of a bare aluminum tool.

A height profile of the bare aluminum tool is shown in FIG. 11. The height variation across 4000 microns is less than 1.0 microns. This degree of roughness leads to trapping of gas bubbles at the composite-tool interface during curing, and to the generation of unacceptably high composite surface porosity.

3. Out-of-Autoclave Composite Manufacturing Using Microstructures Applied to Tool Surfaces As discussed above, microstructures comprising a patterned structure of varying height from the tool surface which is bonded to the tool surface can be used to improve composite production and quality. The examples described hereafter provide a sequential development of different aspects of this inventive concept resulting in an example process employing a inkjet process to develop the microstructures on a tool surface as described in Example 3 with option use of plasma surface treatment as described in Example 1 or an alternate anodizing process as described in Example 2.

Example 1

The objective of this experiment was to eliminate composite pitting by coating the Al tool with a porous fluorocarbon film. The porous fluorocarbon film was deposited on the aluminum by atmospheric pressure, plasma-enhanced chemical vapor deposition. It was hoped that this film would provide for suitable release of the composite from the tool, and for easy escape of gas bubbles during curing.

The average water contact angle (WCA) measured on the surface of an Al tool after it has been properly cleaned and treated with Frekote was 106±1°. A Kruss DSA 15B digital goniometer with DSA 3 software package was used to capture the WCA of a 1 µL droplet of deionized water on the surface. Helium and octofluorocyclobutane ($C_4F_8$) was fed to an atmospheric pressure plasma (Surfx Technologies Atomflo 400 with a 250-D showerhead source). At the same time, ethylene ($C_2H_4$) was fed through a gas distributor into the afterglow immediately below the plasma outlet. The reactive gas flow rates were approximately 30 L/min helium, 0.15 L/min $C_4F_8$ and 0.05 L/min $C_2H_4$. Radio frequency power at 160 W was supplied to the 1"-diameter plasma head to generate an ionized gas, which then broke apart the $C_4F_8$ molecules into fragments. The reactive gas mixture deposited a thin hydrophobic coating on top of the clean aluminum tool which was placed 4 mm distant from the outlet of the showerhead plasma source. The hydrophobic film was deposited by scanning the plasma source at a speed of 20 mm/s, and two full passes were made over the treatment area.

Figure 12:
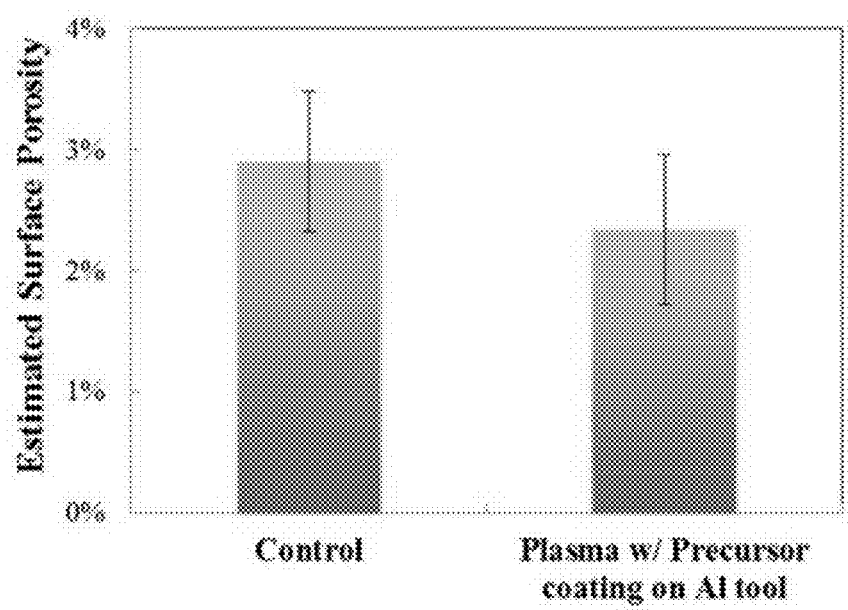
FIG. 12 Surface porosity of out-of-autoclave composites cured on: an Al tool that was coated with mold release (Frekote 815-NC), i.e., the "control"; and an Al tool that was coated with a hydrophobic film deposited by atmospheric pressure, plasma-enhanced chemical vapor deposition.

A composite panel was cured using the Al tool coated with the thin hydrophobic film by plasma-enhanced chemical vapor deposition. The composite materials, layup and curing procedure were the same as that described above and shown in FIG. 2A. As shown in FIG. 12, the surface porosity of the finished composite panel was less than the control panel cured on a flat aluminum tool coated with mold release. The improvement observed proved that a hydrophobic coating deposited by atmospheric pressure, plasma-enhanced chemical vapor deposition provided a novel way of reducing surface pitting on OoA composites. On the other hand, the hydrophobic coating lacked the needed surface height variation in the 1 to 10 micron range that is an additional essential part of the invention.

Figure 13:
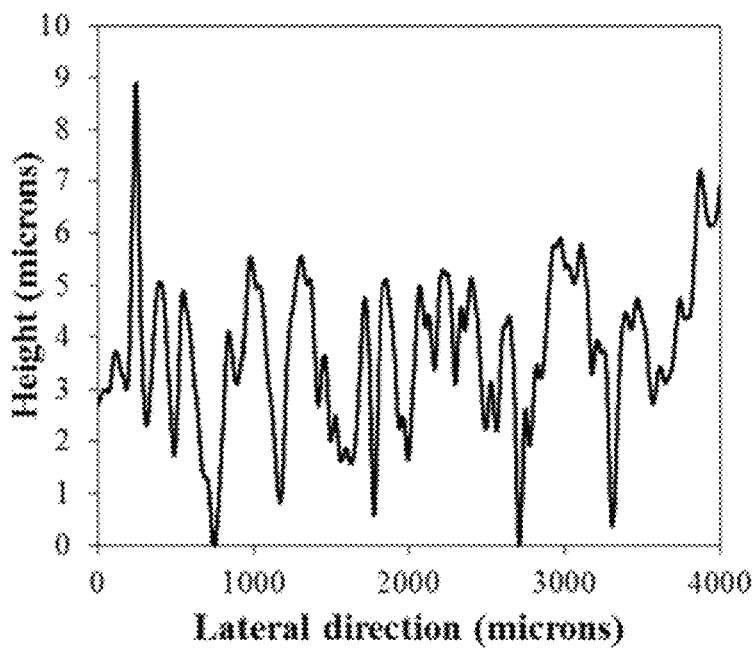
FIG. 13 Surface height profile of an anodized aluminum tool.

Shown in FIG. 13 is the height variation recorded along a 4000 micron distance on an aluminum tool surface that had undergone dye-less Type III anodization in accordance with MIL-A-8625. The anodization process generates a porous oxide layer that is ~25 microns thick. The intention of this anodic layer was to provide a rough surface topography that would permit the escape of gases away from the tool/laminate interface during curing. As can be seen in FIG. 13 the height variation on the anodized aluminum ranges from 3 to 6 microns.

Figure 14:
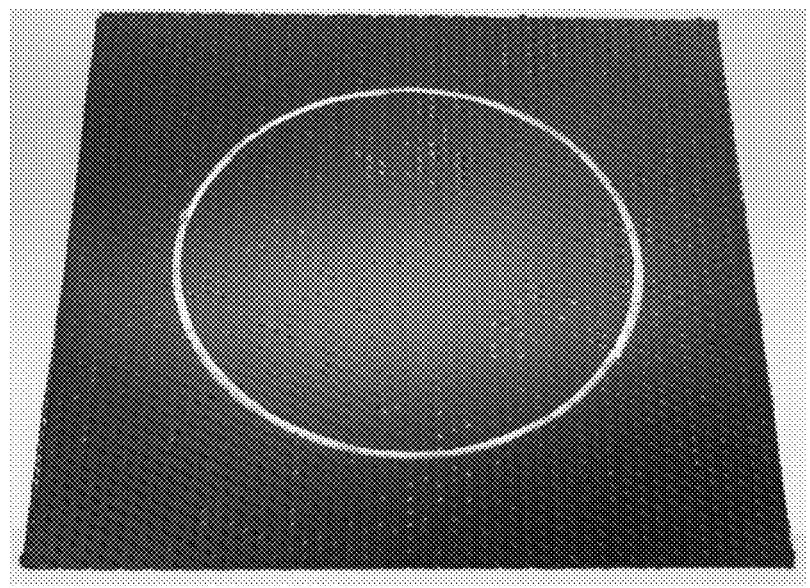
FIG. 14 Picture of out-of-autoclave composite panel cured on the Al tool coated with a hydrophobic film deposited by atmospheric pressure, plasma-enhanced chemical vapor deposition. The porosity was measured inside the white circle.
Figure 15:
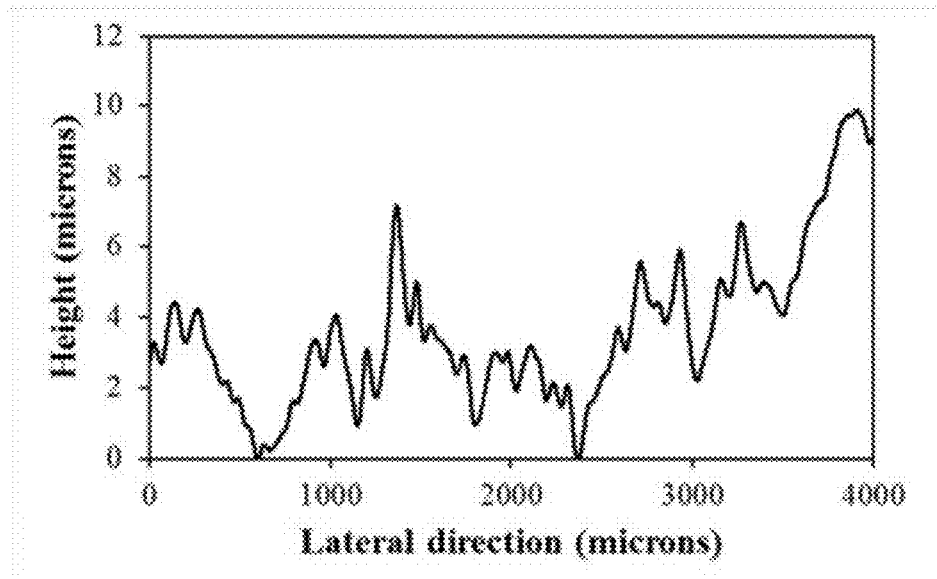
FIG. 15 Surface height profile of out-of-autoclave composite cured on the anodized aluminum tool that was coated with a hydrophobic film deposited by atmospheric pressure, plasma-enhanced chemical vapor deposition.

The anodized aluminum tool was then coated with the hydrophobic film using the previously described atmospheric pressure, plasma-enhanced chemical vapor deposition process. The OoA composite prepared using this tool is shown in FIG. 14. The surface porosity of this panel was found to be 1.0±0.4%, compared to 2.5±0.3% on the bare Al tool with the same coating. Evidently, the topography caused by anodization does help to reduce surface porosity. A line scan of the laminate produced on the anodized tool with the hydrophobic film is shown in FIG. 15. The peak-to-valley height on the composite surface is similar in magnitude to that found on the tool, i.e., between 3 and 6 microns.

Example 2

Figure 16:
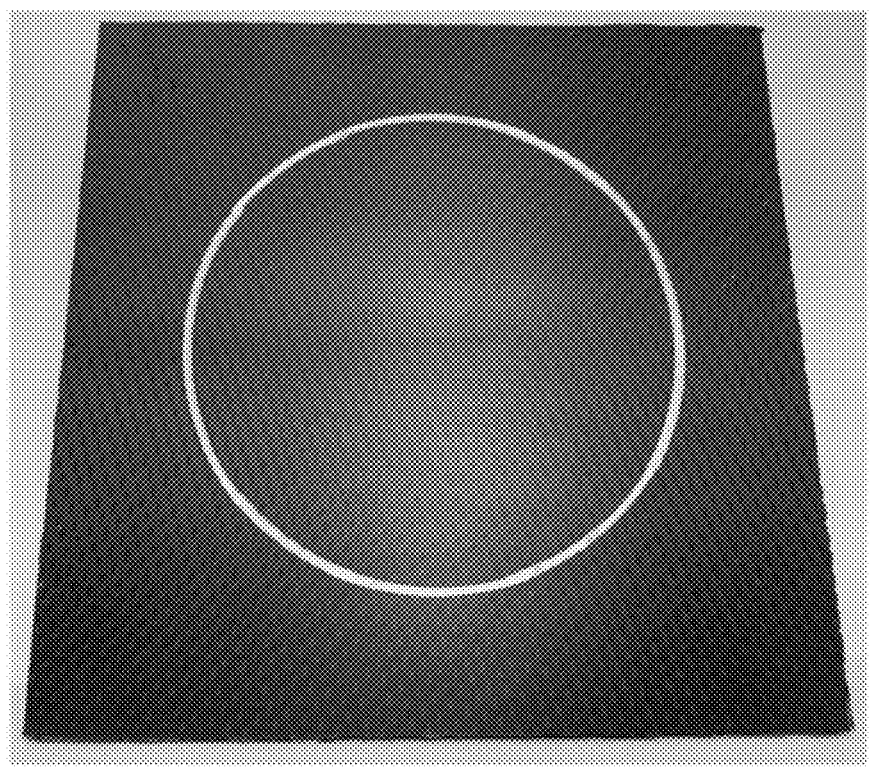
FIG. 16 Picture of out-of-autoclave composite panel cured on an anodized aluminum tool that was coated with mold release (Frekote 815-NC). The porosity was measured inside the white circle.

The anodized aluminum tool was treated with Frekote mold release, and then used to fabricate an OoA composite using the procedures described above. A picture of the resulting composite panel is shown in FIG. 16. No surface porosity is detected in the measurement area shown by the white circle. This unexpected result proves the ability of a tool with a microstructure to produce out-of-autoclave composites with a smooth surface finish. It was further found that the microstructure created by anodization of the aluminum could only be used once, and could not be used repeatedly to generate a smooth OoA composite. This led us to develop further inventive methods and microstructures to solve the pitting problem.

Example 3

Figure 17:
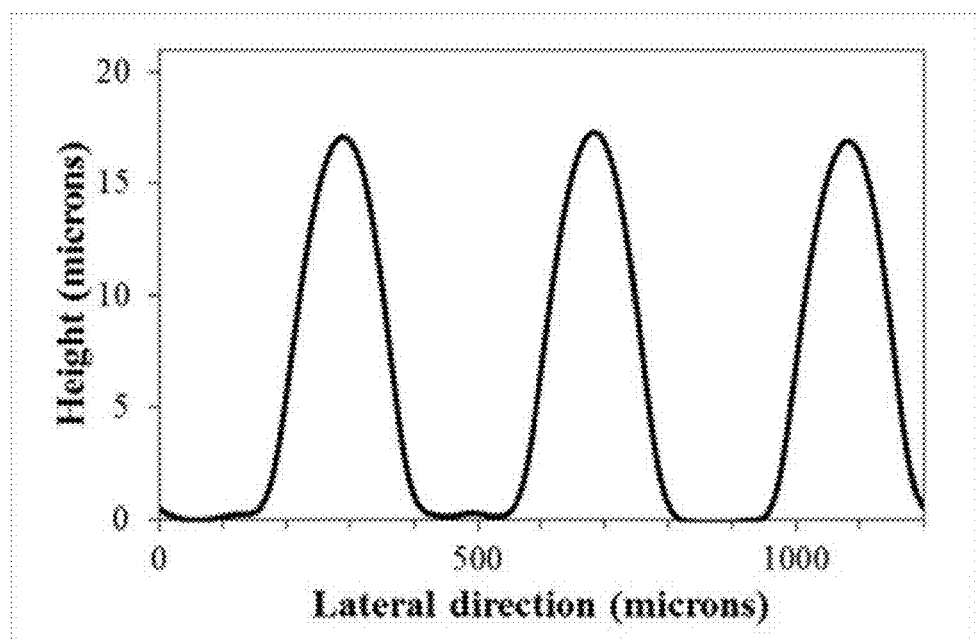
FIG. 17 Surface height profile of an aluminum tool that was coated with an acrylic film having a microstructure, wherein the pattern was generated by ink-jet printing.
Figure 18:
FIG. 18 Image of the surface of an aluminum panel with an ink-jet-printed microstructure (30× magnification; millimeter scale shown on the left side)

In this example, an ordered microstructure, similar to that found on the Taconic woven release ply was deposited directly onto the aluminum tool. The patterned film was deposited onto the metal surface using a Dimatix Materials Printer DMP-3000 with a positional accuracy and repeatability of ±5 and ±1 µm, respectively. The material deposited onto the tool was an acrylic ink that was quickly cured using ultraviolet light. A flat 260×260 mm² Al tool was printed with a 155×155 mm² grid that comprised overlapping horizontal and vertical lines. The lateral height profile of the film deposited by the inkjet printing technique is shown in FIG. 17. An optical micrograph of the film at 30× magnification is presented in FIG. 18. The printed acrylic pattern exhibited a height of 17 microns with a lateral spacing of approximately 350 microns. Note also the shape/distribution of the material within each "hill" of the grid is much sharper compared to the woven release ply, i.e., FIG. 6. This tool was subsequently covered with Frekote mold release and used to manufacture an OOA composite.

Figure 19:
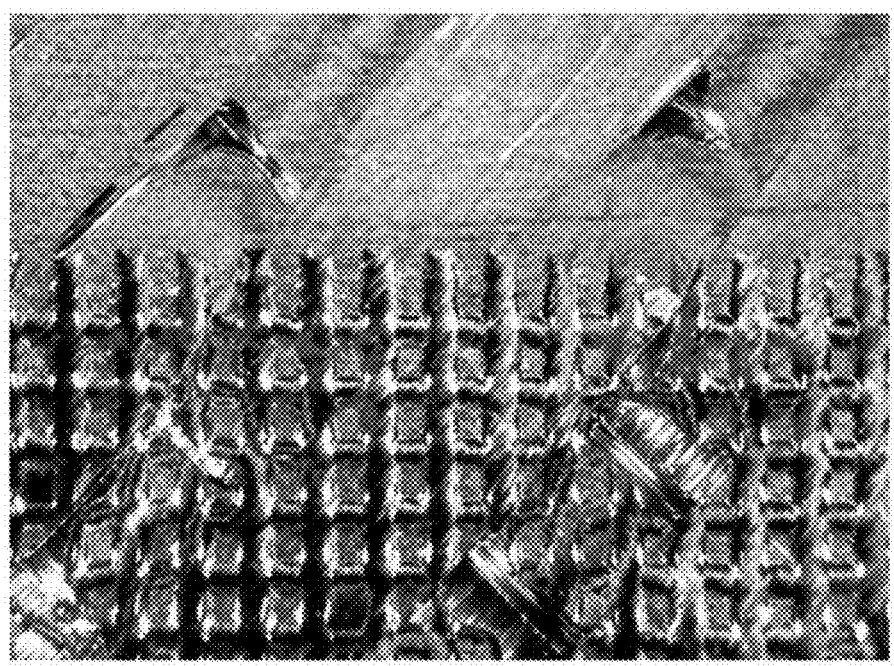
FIG. 19 Image of out-of-autoclave composite surface after curing on an aluminum panel that was coated with an ink-jet-printed microstructure (30× magnification). (The picture was taken at the edge of region where the prepreg was in contact with the microstructure.)

The cured composite produced on the grid pattern after Frekote application released from the tool without any issue. After profilometer characterization, we found the tool-side surface peaks on the composite to be approximately 18 microns in height. The pattern from the grid could be readily seen on the composite. A magnified image of the composite panel at the edge of the pattern is shown in FIG. 19. The image captures a transition area where the grid ends and flat surface begins. It is important to note that the grid pattern has transferred onto the composite panel itself, which indicates that the structural integrity of the grid remained after cure. Also the sharp interface indicated that there were no mechanical issues with the grid during the cure cycle. Two triangular shaped pits are visible in the smooth area of the surface; while two blurry areas are also visible in the grid portion of the image. Both of these features suggest entrapped gas and pitting.

Figure 20:
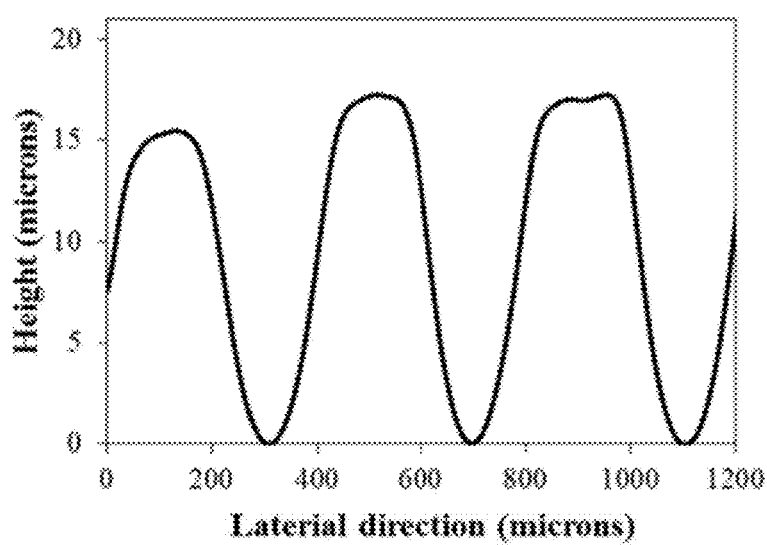
FIG. 20 Surface height profile of out-of-autoclave composite cured on the aluminum tool with the ink-jet-printed acrylic microstructure.

The surface height profile obtained for the OoA composite produced on the Al tool with the acrylic pattern is shown in FIG. 20. The vertical distance from peak to valley is approximately 16 microns, which matches fairly closely the height of the features generated on the ink-jet-printed grid (c.f., FIG. 17). Furthermore, the peaks on the composite surface have flat tops several hundred microns wide, which correspond well in width to the flat valleys within the grid. This suggests that the resin flowed into the bottom of the valleys within the acrylic grid, and could explain why gas bubbles were most likely unable to escape from the composite-tool interface during curing. Note that in the case where the Taconic 7058 release ply was used, the vertical distance from peak to valley on the OoA composite surface was ~4 microns (c.f., FIG. 7), compared to a vertical distance of 6 to 10 microns for the release ply (c.f., FIG. 6). In this latter case, the OoA epoxy resin is unable to flow into the bottom of the grid pattern, leaving sufficient space for gas bubbles to escape from the composite-tool interface during curing. In conclusion, an embodiment of the present invention is a tool having a microstructure with peaks and valleys in the range of 2 to 10 microns in height and with a shape that has narrow valleys less than 100 microns in width.

Figure 21:
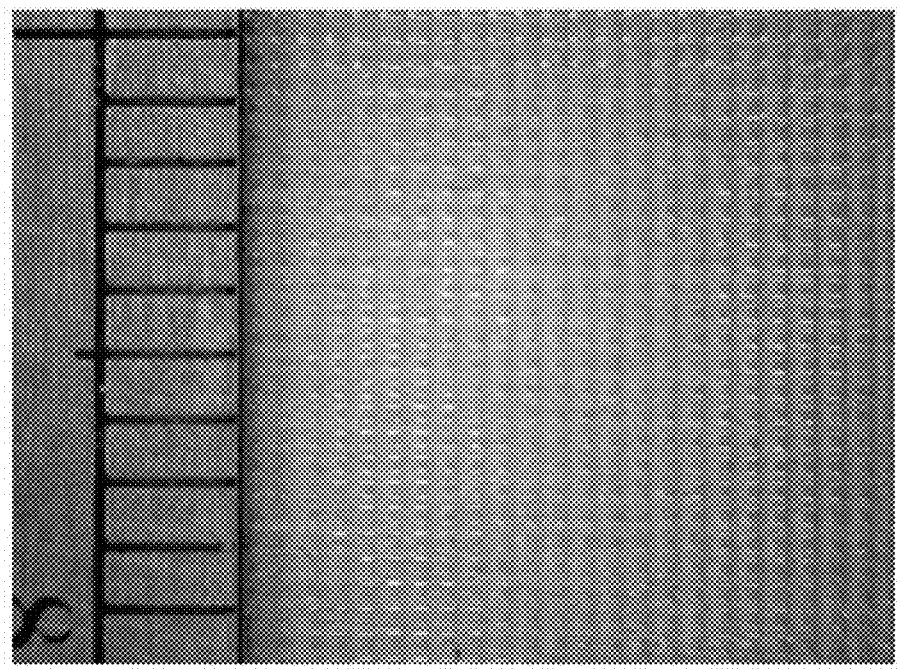
FIG. 21 Image of the surface of an aluminum tool with an ink-jet-printed microstructure after having been used to fabricate an out-of-autoclave composite panel (30× magnification; millimeter scale shown on the left side)

After curing the composite, the micro-structured aluminum tooling was re-examined for structural integrity of the printed acrylic pattern. A 30× optical micrograph of the grid after laminate manufacture is shown in FIG. 21. The vertical and horizontal lines of the polymer are easily discernible, indicating that the microstructure remained intact after curing at elevated temperature.

Figure 22:
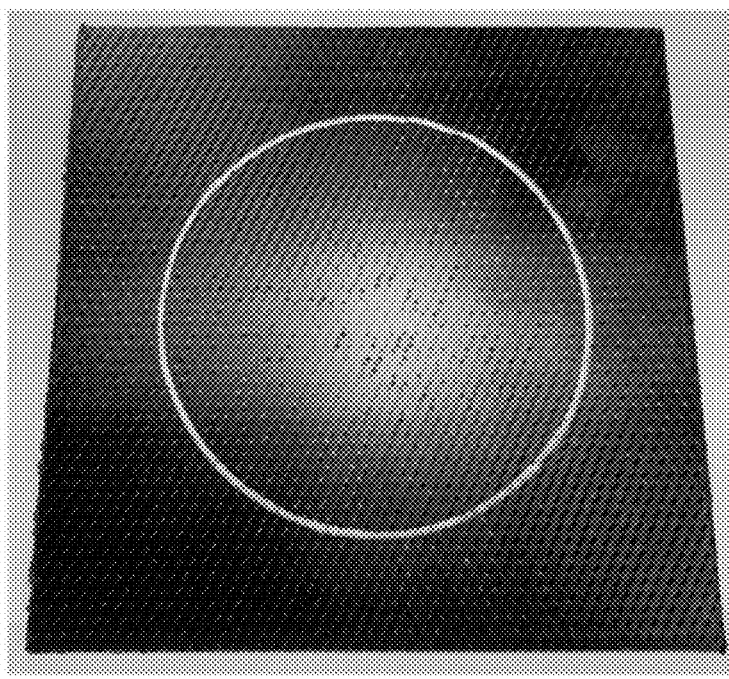
FIG. 22 Picture of out-of-autoclave composite panel cured on an aluminum tool that was coated with an ink-jet-printed microstructure. (The porosity was measured inside the white circle)

A picture of the out-of-autoclave composite panel produced on the aluminum tool with the inkjet-printed structure is shown in FIG. 22. The surface porosity on this panel is determined to be 4%. This value most likely over estimates the porosity, since the texture created by the acrylic microstructure was picked up by the image-processing method. Nevertheless, it demonstrates that microstructures which allow the polymer resin to fully flow into the valleys are not well suited for manufacturing out-of-autoclave composites with smooth surface finishes. By contrast, an embodiment of the invention is that the microstructure should prevent flow of the polymer resin into it, so that there are open channels for evolved gases to flow away from the composite-tool interface and not be trapped there and cause surface pitting.

4. Further Ramifications of Using Microstructures Applied to Tool Surfaces

Many strategies for producing the surface topography, such as aerogels, micro-machining, and laser-machining are possible. However, each of these three methods lacked scalability and adaptability, while costing orders of magnitude higher than inkjet printing. Aerogels, which cost approximately \$50/in², are rejected as not viable, since the coating process cannot be adapted to the countless tools that have been made and are still in use, nor can this technique be scaled to produce tools the size of an aircraft wing. Micro-machining, quoted as costing over \$100/in² at the size and precision required, is slow, has a high risk of damaging old tools, and offers no solution to re-work tools. Laser-machining, while more precise than micro-machining, is also more expensive (>\$100/in²) and slower, while also not addressing re-work. On the other hand, inkjet printing is cheap (<\$0.005/in²), fast (<1 min/in² depending on the complexity of the structure), can be adapted to any tool shape, and is easily reworked. Instead of making a bulk change to the tool material (e.g. aerogel) or permanently and irreversibly carving the tool surface (micro- or laser-machining), inkjet printing constructs a semi-permanent, re-workable surface structure without risking damaging the tool. Therefore, producing micro-scale structured topography on a tool surface to using an inkjet printing process is most promising.

It should be noted that the method to apply microstructures the tool surface is not limited to inkjet printing, or any other variation of printing process. However, application by printing (such as inkjet) should not be restricted to any particular tool material (e.g. aluminum, composite, invar, plastic, etc.). Another advantage of the microstructure method is that, because it additive (i.e. not subtractive or removing material as in the case of machining), printing applied microstructures are capable of being easily removed or reworked using proper chemistry.

In addition, printing applied microstructures are capable of being applied on contours in both positive and negative tool configurations. Moreover, microstructures can be manufactured by materials that can be cured, either by UV, heat, pressure, etc. or immediately rigid materials. Preference may be given to materials needing curing as to facilitate rework if necessary.

Figure 23:
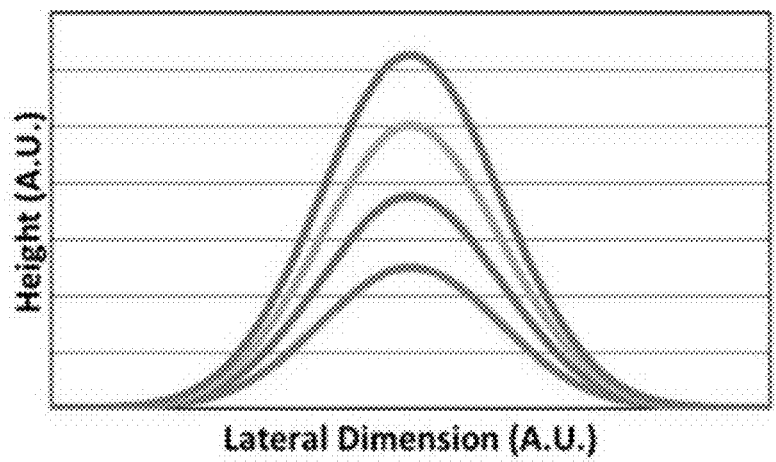
FIG. 23 Profile of a single microstructure (which may be repeated in a pattern) to be generated on the tool surface with varying height.
Figure 24:
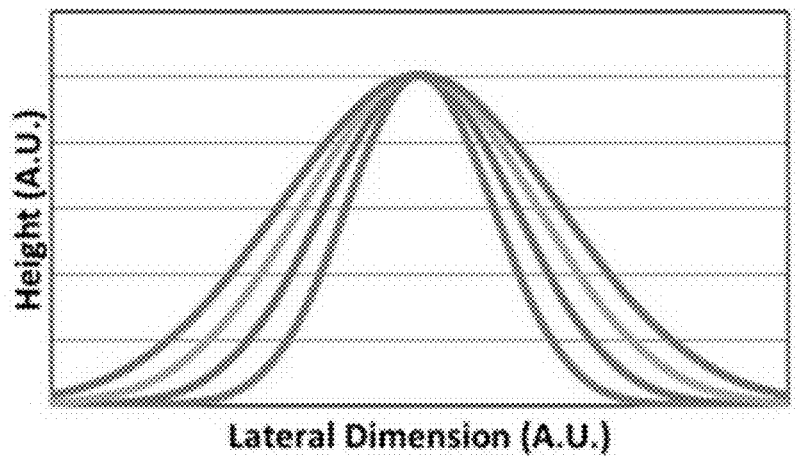
FIG. 24 Profile of a single microstructure (which may be repeated in a pattern) to be generated on the tool surface with varying width.
Figure 25:
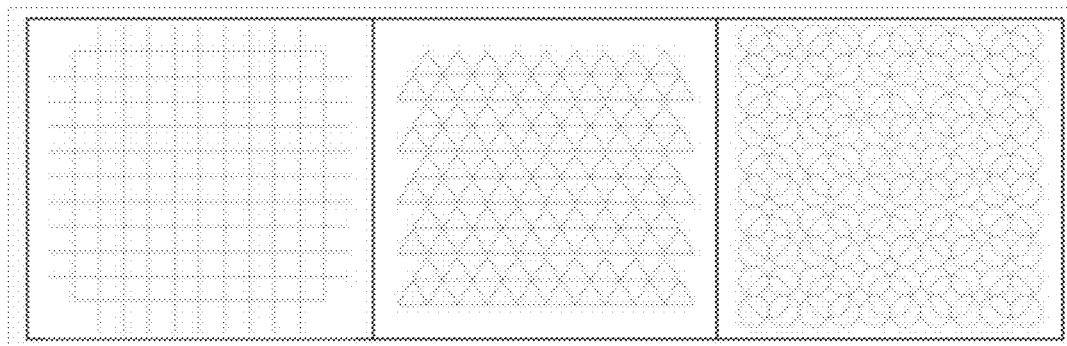
FIG. 25 Examples of three different patterned structures to be deposited on tool surfaces in order to produce out-of-autoclave composites with smooth surface finishes.

Inkjet or 3D printing allows a precise amount of a material to be deposited on a tool surface, either at single or multiple points at a time, with micrometer-scale control and resolution (both laterally and vertically). The printing method can be designed to produce a specific height of the feature on the tool surface as shown in FIG. 23. In addition, the width of the feature can be adjusted as illustrated in FIG. 24. Finally, the grid or weave pattern may be varied to give an optimal microstructure for manufacturing porosity-free OoA composite. Three examples of different patterns are shown in FIG. 25. Note that the microstructure can also have no repeating pattern; instead, it may be a randomly distributed structure similar to that observed after anodizing a surface.

Figure 26:
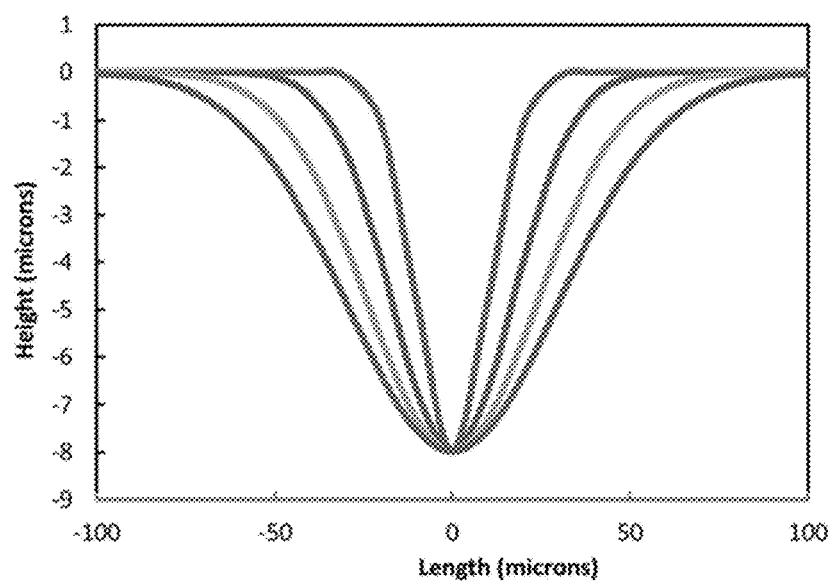
FIG. 26 Shapes of valleys that can selected.

An embodiment of the invention is the specific cross-sectional shape of the valleys in the microstructure. This shape is selected such that it prevents the OoA polymer resin from flowing into the valleys and restricting gas escape during curing. Shown in FIG. 26 are shapes of valleys that are selected to meet the requirements of the invention. They are wide at the top and narrow at the bottom, with a minimal flat region at the bottom. The width of the valleys should be less than about 100 microns, and the vertical distance from top to bottom can be in the range of 2 to 20 microns, with a range of 5 to 10 microns being well suited for the application. The distance between the valleys and peaks should be in the range of 10 to 10,000 microns, and a range of 100 to 1,000 microns is well suited for the application. The optimal valley shape is to be selected depending on the physical characteristics of the resin (i.e. surface energy, hydrostatic pressure, viscosity, etc.). Several alternate methods may be used to create the desired microstructure on the tooling. The ink-jet printing method is a particularly attractive method, due to its ability to create precise microstructures at a relatively fast speed over a large surface area, and at a low cost.

Other suitable methods for creating the microstructures with the desired valley shapes include a range of lithographic techniques, including but are not limited to, plasma etching, chemical etching, screen-printing, and stenciling. For example, with the etching techniques, a chemical or mechanical mask is placed on the tool surface. In an example of screen-printing or stenciling, a conformal macro-scale stencil with micro-scale features is placed on top of the tool and a blanket coat of the structure material is painted on the stencil, resulting in material coating only the intended areas at the micro-scale. Curing of the coating can take place either with the stencil in place, or with it removed. This process may be repeated several times to achieve the desired microstructure for out-of-autoclave composites with smooth surface finishes. Those skilled in the art will readily appreciate any known lithographic techniques which may be readily applied to develop suitable microstructures onto tool surfaces. Further examples of microstructure processing are described hereafter.

Figure 27:
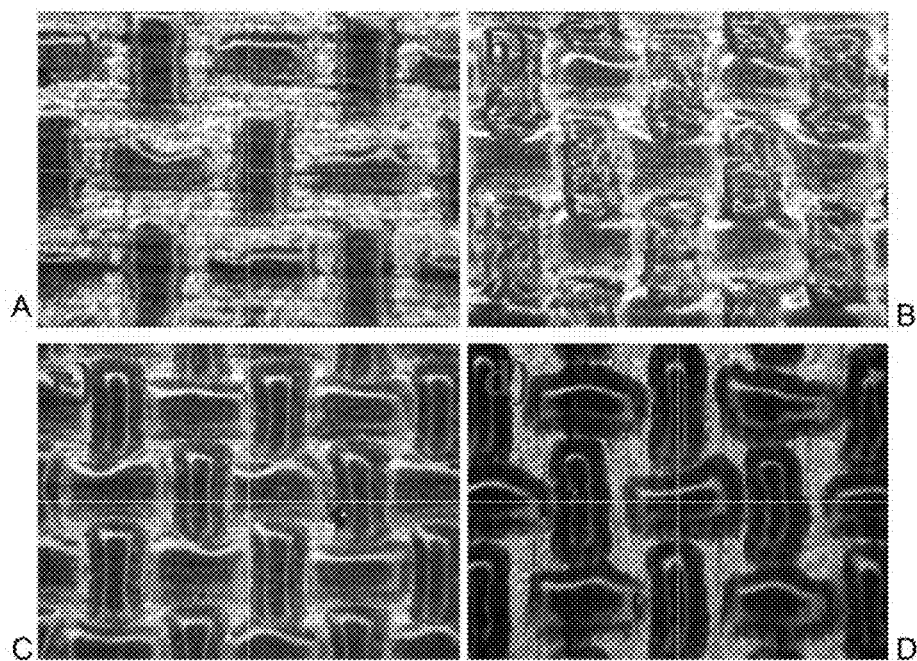
FIG. 27 Collins UV Purple microstructure representative image of a) Tool A, b) Tool B, c) Tool C, and d) Tool D (image size is 1.628 by 1.221 mm)

Representative images of the four structures defined in Table 1 are shown in FIG. 27. The differences in richness of color of the images are due to lighting effects and not mechanical or physical properties of the structures. The four tools are all plain weave designs but differ in element spacing or height. The shape of vertical elements in Tool B, FIG. 27b, are clearly different than the other elements shown in FIG. 27. In fact, this tool had five distinct sections visible to the naked eye, which revealed elements varying from rectangular to thin bars to snowflakes when viewed using an optical microscope. Elements were not consistent on Tool B due to a built in cleaning cycle throughout the print which is designed to unclog nozzles but instead continued to change the shape of the clog and thus the shape of the microstructure. Due to partial clogging in piezo driven nozzles the third tool was printed using the same dimensions as intended for Tool B. The fourth tool was made with increased element height while minimizing the spacing between elements. Final microstructure dimensions for the four tools with plain weave patterns are shown in Table 2. These dimensions were measured using pictures captured with printer's camera and the known ratio of one pixel to 2.54 um.

TABLE 1

Design dimensions for Example Collins UV Purple Plain Weave Tools

| Tool ID # | Element Dimensions (um) | | | Element Spacing (um) | |
|---|---|---|---|---|---|
| | Height | Width | Length | X | Y |
| A | 20 | 200 | 400 | 100 | 125 |
| B | 20 | 200 | 400 | 10 | 20 |
| C | 20 | 200 | 400 | 10 | 20 |
| D (horizontal/vertical) | 30 | 180 | (450/420) | 60 | 75 |

TABLE 2

Actual Dimensions of elements and element spacing for tools.

| Tool ID # | Element Dimensions (um) | | Element Spacing (um) | |
|---|---|---|---|---|
| | Width | Length | X | Y |
| A | 477 ± 49 | 218 ± 18 | 60 ± 8 | 92 ± 10 |
| B | 417 ± 9 | 243 ± 7 | 6 ± 4 | 0 |
| C | 410 ± 6 | 239 ± 6 | 4 ± 3 | 7 ± 5 |
| D (horizontal/vertical) | 464 ± 10 / 476 ± 9 | 275 ± 9 / 249 ± 4 | 26 ± 13 | 5 ± 3 |

Figure 28:
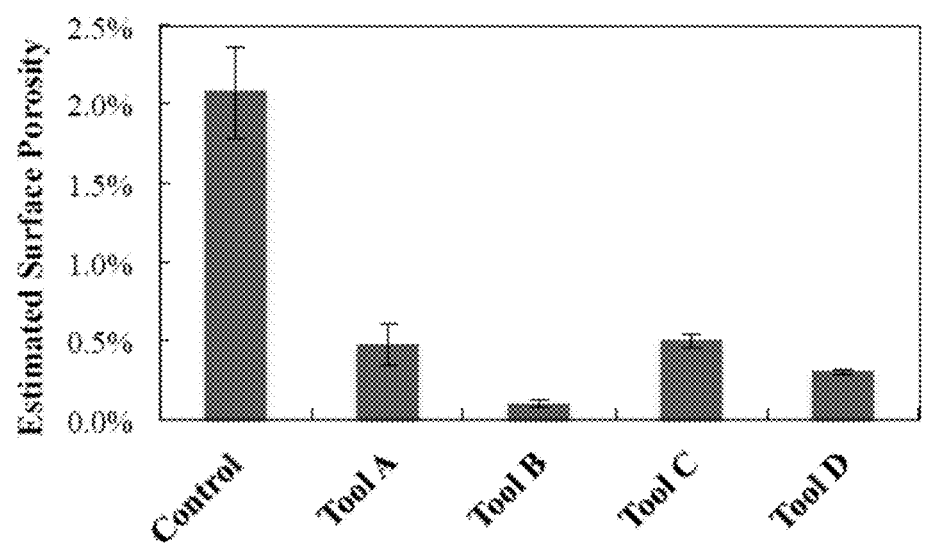
FIG. 28 Estimated surface porosity of tools made with Collins UV Purple ink.

Tool A exhibited the larges element variation, with standard deviation of ~10% in all dimensions. Although Tool B had the largest deviation from element to element, only elements rectangular in shape were measured. Eleven laminates were produced on the four tools at different cure ramp rates and variations in prepreg materials. Surface porosity estimates are show in FIG. 28 for the microstructured tools along with a control. Note, both Tool A and Tool C produced two laminates prior to curing a laminate used for porosity estimations shown in FIG. 28. Porosity estimates were not calculated on any of the 3K laminates due to visually higher porosity levels when compared to 12K laminates. All five laminates used for estimates were cured using 12K prepreg material at 0.6° C./min ramp rate.

All of the microstructured tools reduced composite surface porosity from 2.1 to ≤0.5%, with tool B resulting in 0.1%. Since 3K prepreg material was cured on tool C twice prior to using 12K prepreg, the element height continued to increase with every cure. The topography of microstructured tools was examined to characterize changes in element shapes after the OOA process. Minor differences in height between horizontal and vertical elements were evident. The differences varied from tool to tool but were all within 10%. Also, the average element height was measured to be twice of what was expected on Tools A-C. Tool C test patterns were evaluated using the WYKO NT 2000 system and an average of 15.5±1.0 micron was calculated for elements printed using 20 micron DS.

Tool D was produced with a similar plain weave pattern as Tools A-C but with slightly taller elements. This structure was examined immediately after it was printed, after the Frekote bake step, and after laminate cure to chart changes with respect to element height. In addition, a laminate-free vacuum bake at 178° C. for two hours was performed to evaluate the possibility of returning structure shape back to its pre-cure form.

Average element height was reduced from 24.4±0.3 to 21.1±0.3 microns following mold release application and two hour bake at 178° C. A laminate was then cured on the tool which increased element height to 28.6±0.8 microns.

Figure 29:
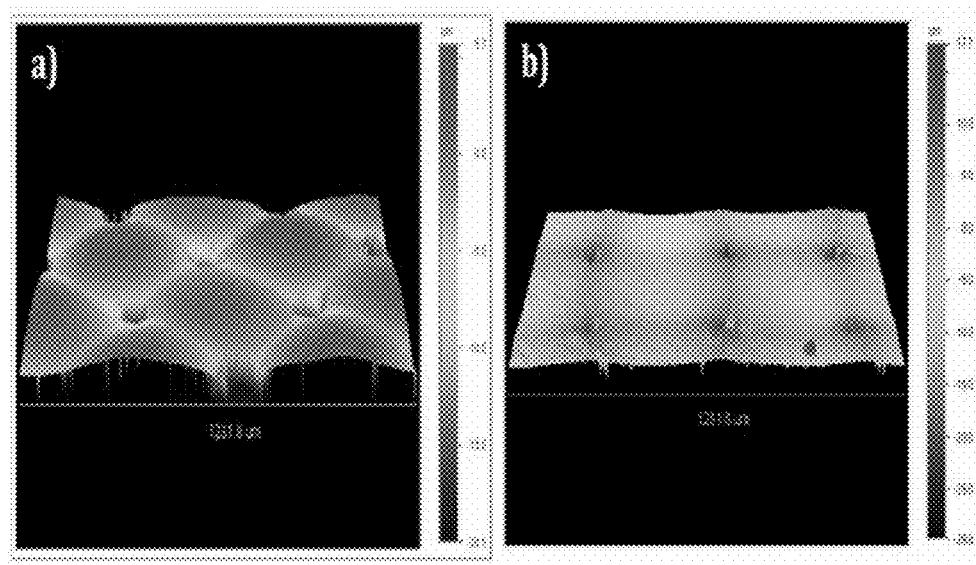
FIG. 29 Representative surface images at 5× objective lens of a) Taconic 7058 woven release and b) laminate cured against the release.

Adding post cure cycle to the tool did not affect element shapes, signaling that some resin may be left on the structure after contact with the laminate. Based on the height variations observed between the third and fourth cures on Tool B, the element shape may stabilize after multiple cures. Taconic 7058 and a corresponding laminate produced on it were re-examined to obtain more accurate three dimensional data. Only the 10× objective lens was capable of capturing elevation change between flat surfaces on the laminate and peaks of resin ridges left by the woven release. The average resin peak height was 29.1±5.0 microns. Representative images of the woven release and a laminate surface cured against the release are shown in FIG. 29.

Most resin peaks on the laminate were in the 20 to 30 micron range while some were measured at as high as 52 microns. The large variation indicates an abundant capacity for air storage inside the wells created between fiberglass tows shown in FIG. 29A. Unfortunately, the optical profiler was unable to measure the bottom of the wells created by tow intersections. An attempt was made to extrapolate the valley shape and depth based on data collected on the tows, but this resulted in an average depth of only 20 microns which does not account for the much taller resin peaks observed on the laminate. Two theories exist which can explain how woven release eliminates surface porosity: 1) the depth of wells at perpendicular fiber tow intersections is much deeper than 50 microns, which results in a capillary effect that prevents resin from reaching the well bottom, thereby creating pockets for air to reside during cure; and 2) the release well depth is in fact 20 to 30 microns deep when not in use, but is stretched to much greater depths due to a pressure gradient during cure (i.e. air on resin side versus vacuum on tool side at the wells). In the latter theory, air is again trapped in the wells, which stretches to accommodate the added volume. Similar capabilities to increase well depth and in turn create space for air may be all that is needed during laminate cure to rid the surface of pitting.

Due to a current inability to create elastic structures, tests were carried out to investigate the possible capillary effect. Three test patterns were printed with 300 micron wide (design) lines with valleys as deep as 40 microns. The three patterns are compared using three important criteria: actual peak to peak (P2P) distance, average valley depth (AVD), and FWHM. A second tool was produced using the same channel pattern, but with periodic walls along the channels to create a grid of wells. Micrographs of both designs are shown in FIG. 30 and FIG. 31 respectively.

Figure 30:
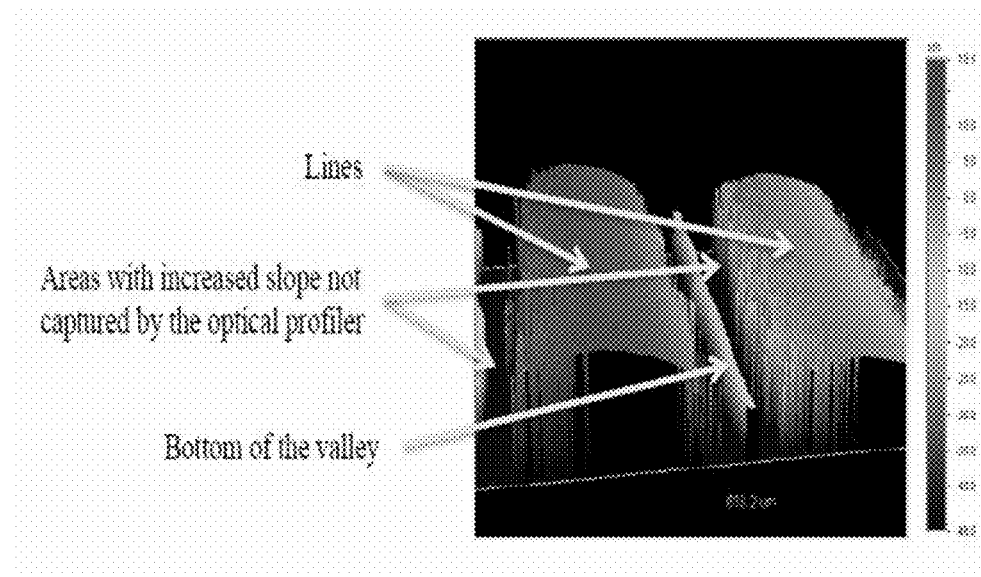
FIG. 30 Representative image of capillary effect test pattern design, with adjacent lines only, taken with the 10× objective lens.
Figure 31:
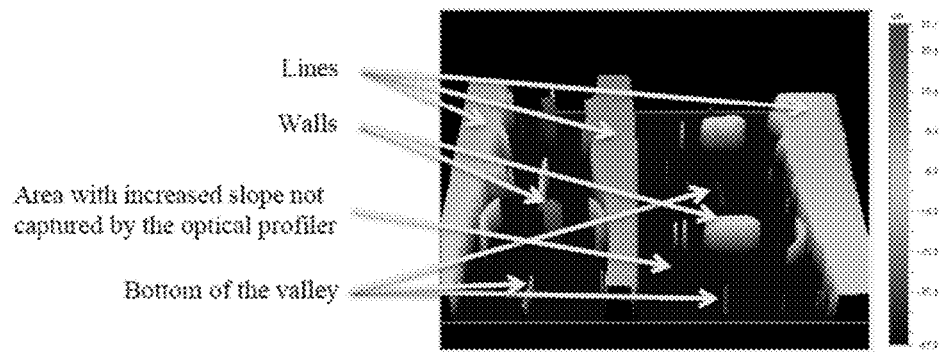
FIG. 31 Representative image of capillary effect test pattern design, with adjacent lines and repeating walls inside the valleys, taken with the 5× objective lens.
Figure 32:
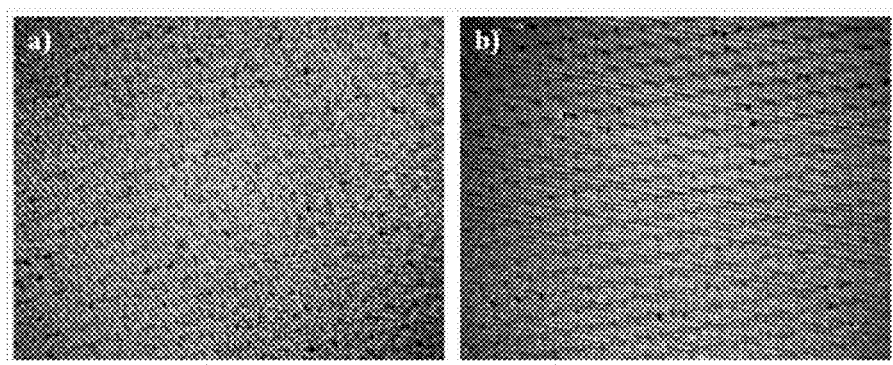
FIG. 32 Representative image of laminate cured against a) Tool E and b) Tool F (image size is 60 by 44 mm).

The shape of adjacent lines and valley floor between the two are displayed in FIG. 30. Depositing extra ink to serve as walls in the valleys at periodic intervals created wells. A surface micrograph of adjacent lines, valleys, and extra ink walls is shown in FIG. 31. Note that the image consists of mostly flat areas of the three features, as the profiler was unable to capture areas with large slopes. In most instances, the wall height was greater than that of adjacent lines in which the walls were placed. Three and four step printing was required to create the full sized tools for laminate cure. Lines #1, 4, 7 . . . were printed during first step, following by lines #2, 5, 8 . . . in the second, and #3, 6, 9 . . . in the third. The tool with added walls required a fourth print step which inserted 100 microns squares using 10 micron DS every 250 microns into all of the valleys. The tool with adjacent lines only was labeled Tool E, and the tool with adjacent lines and walls was labeled Tool F. Patterns on Tool E and F were examined using optical profiler immediately after the print, Frekote bake, and post laminate cure. A single laminate was cured against each tool, with representative surface images shown in FIG. 32.

At first glance the laminate cured against Tool E (FIG. 10a) appears to have zero surface porosity. However, examining the laminate closer and from different angles, some porosity masked by continuous resin rich lines along the surface is observed. The laminate cured against Tool F had less drastic definitions but porosity was still evident. Attempts were made to calculate porosity on the two surfaces but excess resin presented challenges in accurately capturing all of the pitting. Visual comparison of the two laminates to the first laminate cured on Tool B showed at least double the porosity level.

A rough estimate of porosity levels on laminates from Tool E and F are ~0.5%. Closer examination of the microstructure on Tool F showed signs of ink dispersion similar to Tool B. Clogged injectors are likely responsible for reducing the height of adjacent lines and clogging up the valleys. Unfortunately, poor structure printing may have invalidated the capillary effect this pattern was designed to test. New printing techniques for the pattern will have to be evaluated in order to effectively test capillary action as a method for eliminating surface porosity on OOA laminates.

What is claimed is:

1. A method for composite manufacture, comprising:
preparing a tool surface for composite manufacture for producing a microstructure thereon; and
producing a microstructure of three-dimensional relief bonded to the tool surface, the microstructure comprising a patterned structure of topographical variation having varying height from the tool surface across the microstructure having valleys, the composite material comprising one or more layers of prepreg and a resin;
wherein the composite manufacture comprises laying up and curing the composite material against the microstructure after bonding the microstructure to the tool surface and a shape of the valleys is such that the resin is prevented from flowing into the valleys and restricting gas escape during curing.

2. The method of claim 1, wherein the microstructure is produced on the tool surface using an inkjet printing process.

3. The method of claim 1, wherein the microstructure is produced on the tool surface using a lithographic process.

4. The method of claim 1, wherein the varying height from the tool surface varies from 1 micrometer to 200 micrometers from the tool surface.

5. The method of claim 1, wherein the patterned structure of varying height from the tool surface comprises a weave, a grid, a twill pattern, a harness satin, checkerboard, parallel ridges, or interconnected channels.

6. The method of claim 1, wherein the patterned structure of varying height from the tool surface comprises elements including rectangles, triangles, or circles.

7. The method of claim 1, wherein the microstructure is formed from a material comprising a resin, an acrylic, or a paste.

8. The method of claim 1, wherein preparing the tool surface comprises a plasma treatment.

9. The method of claim 1, wherein preparing the tool surface comprises cleaning the tool surface.

10. The method of claim 9, wherein cleaning the tool surface comprises treating the tool surface with a cleaning agent.

11. The method of claim 1, further comprising:
molding a composite against the tool surface having the microstructure thereon such that a composite surface of the composite comprises a substantial mirror image of the patterned structure of varying height of the microstructure.

12. The method of claim 11, further comprising:
applying a mold release to the tool surface prior to molding the composite against the tool surface.

13. The method of claim 11, further comprising:
applying a release ply between the tool surface and the composite prior to molding the composite against the tool surface.

14. The method of claim 11, wherein molding the composite is performed using an out-of-autoclave (OoA) process.

15. The method of claim 14, wherein molding the composite is performed out-of-autoclave (OoA) in a premade vacuum bag.

16. The method of claim 1, wherein the microstructure comprises peaks and valleys in a range of 2 to 20 microns in height.

17. The method of claim 16, wherein the valleys comprise a wide top and a narrow bottom.

18. The method of claim 16, wherein distance between the valleys and the peaks is in the range of 10 to 10,000 microns.

19. The method of claim 1, wherein the tool surface comprises a contour shape.

* * * * *